(12) United States Patent
Aditya et al.

(10) Patent No.: US 11,441,556 B2
(45) Date of Patent: Sep. 13, 2022

(54) UTILIZING ANALYTICAL MODELS TO IDENTIFY WELLS IN WHICH TO INSTALL PLUNGER LIFT FOR IMPROVED WELL PRODUCTION

(71) Applicant: Accenture Global Solutions Limited, Dublin (IE)

(72) Inventors: Susarla Aditya, Bengaluru (IN); Subrahmanyam Vadrevu, Hyderabad (IN); Rabinarayan Mishra, Bengaluru (IN); Sangameshwar Kardkal, Bengaluru (IN); Anusha K K, Bengaluru (IN); Jitender G. Singh, Bengaluru (IN)

(73) Assignee: Accenture Global Solutions Limited, Dublin (IE)

( * ) Notice: Subject to any disclaimer, the term of this patent is extended or adjusted under 35 U.S.C. 154(b) by 824 days.

(21) Appl. No.: 16/382,573

(22) Filed: Apr. 12, 2019

(65) Prior Publication Data
US 2020/0325889 A1   Oct. 15, 2020

(51) Int. Cl.
| | |
|---|---|
| *F04B 47/12* | (2006.01) |
| *G06F 16/909* | (2019.01) |
| *F04B 41/02* | (2006.01) |
| *F04B 51/00* | (2006.01) |
| *G06N 3/08* | (2006.01) |
| *G06N 7/00* | (2006.01) |

(52) U.S. Cl.
CPC ............ *F04B 47/12* (2013.01); *F04B 41/02* (2013.01); *F04B 51/00* (2013.01); *G06F 16/909* (2019.01); *G06N 3/08* (2013.01); *G06N 7/00* (2013.01)

(58) Field of Classification Search
None
See application file for complete search history.

(56) References Cited

U.S. PATENT DOCUMENTS 6,980,940 B1 * 12/2005 Gurpinar ................. E21B 43/00
                                                              166/250.16

OTHER PUBLICATIONS

Shokir, E.M., Hamed, M.M., Ibrahim, A.E., & Mahgoub, I.S. (2017). Gas Lift Optimization Using Artificial Neural Network and Integrated Production Modeling. Energy & Fuels, 31, 9302-9307 (Year: 2017).*

(Continued)

*Primary Examiner* — Roy Y Yi
(74) *Attorney, Agent, or Firm* — Harrity & Harrity, LLP

(57) ABSTRACT

A device receives first well data associated with first wells where plunger lift is installed, and receives second well data associated with a candidate well where plunger lift is not installed. The device processes the first well data to determine pre-plunger lift installation data associated with the first wells, and processes the first well data and the pre-plunger lift installation data to determine a set of performing wells and a set of underperforming wells, of the first wells. The device processes the second well data and data associated with the set of performing wells to determine a first metric associated with the candidate well, and processes the second well data and data associated with the set of underperforming wells to determine a second metric associated with the candidate well. The device determines whether to install plunger lift in the candidate well based on the first metric and the second metric.

20 Claims, 14 Drawing Sheets

(56) References Cited

OTHER PUBLICATIONS

Ansari A., et al., "Data-Based Smart Model for Real-Time Liquid Loading Diagnostics in Marcellus Shale via Machine Learning", SPE Canada Unconventional Resources Conference, Mar. 13-14, 2018, 11 pages, XP055725596.
Extended European Search Report for Application No. EP20165431.6, dated Sep. 4, 2020, 8 pages.
Ounsakul T., et al., "Artificial Lift Selection Using Machine Learning", International Petroleum Technology Conference, Mar. 26-28, 2019, 7 pages, XP055725591.

* cited by examiner

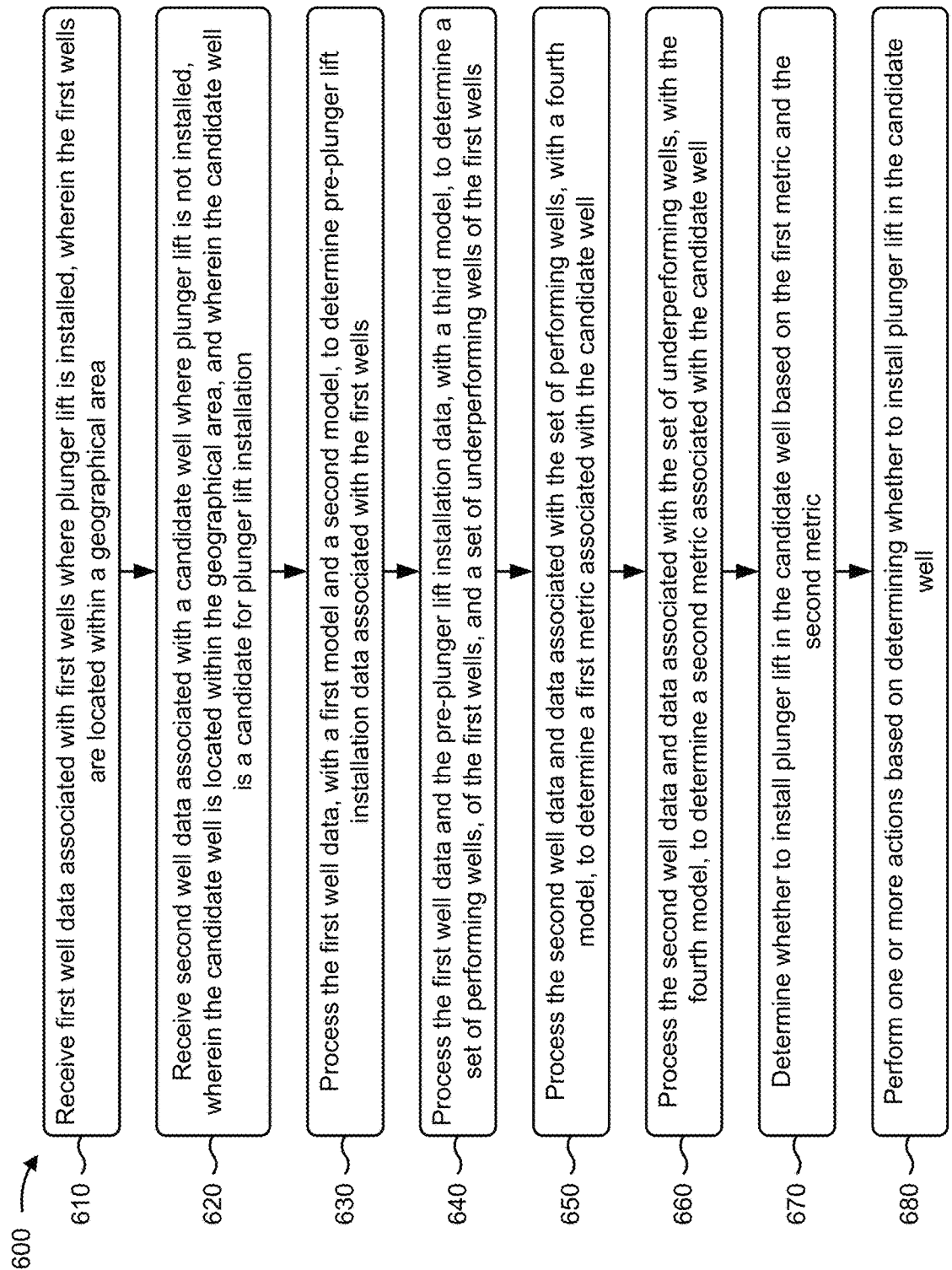

UTILIZING ANALYTICAL MODELS TO IDENTIFY WELLS IN WHICH TO INSTALL PLUNGER LIFT FOR IMPROVED WELL PRODUCTION

BACKGROUND

Plunger lift is an artificial lift method that removes contaminants from a well, such as a natural gas well. A plunger is used to remove the contaminants, such as water (e.g., in liquid, mist, or ice form), sand, oil, wax, and/or the like, from a natural gas well in order to improve productivity of the well.

SUMMARY

According to some implementations, a method may include receiving first well data associated with first wells where plunger lift is installed, and training one or more analytical models with the first well data to generate one or more trained analytical models. The method may include receiving second well data associated with second wells where plunger lift is installed, wherein the second wells are located within a geographical area, and receiving third well data associated with a candidate well where plunger lift is not installed, wherein the candidate well is located within the geographical area, and wherein the candidate well is a candidate for plunger lift installation. The method may include processing the second well data, with the one or more trained analytical models, to determine pre-plunger lift installation data associated with the second wells, and processing the second well data and the pre-plunger lift installation data, with the one or more trained analytical models, to determine a set of performing wells, of the second wells, and a set of underperforming wells of the second wells. The method may include processing the third well data and data associated with the set of performing wells, with the one or more trained analytical models, to determine a first metric associated with the candidate well, and processing the third well data and data associated with the set of underperforming wells, with the one or more trained analytical models, to determine a second metric associated with the candidate well. The method may include determining whether to install plunger lift in the candidate well based on the first metric and the second metric, and performing one or more actions based on determining whether to install plunger lift in the candidate well.

According to some implementations, a device may include one or more memories, and one or more processors, communicatively coupled to the one or more memories, to receive one or more trained analytical models, wherein the one or more trained analytical models are trained with first well data associated with first wells where plunger lift is installed. The one or more processors may receive second well data associated with second wells where plunger lift is installed, wherein the second wells are located within a geographical area, and may receive third well data associated with a candidate well where plunger lift is not installed, wherein the candidate well is located within the geographical area, and wherein the candidate well is a candidate for plunger lift installation. The one or more processors may process the second well data, with the one or more trained analytical models, to determine pre-plunger lift installation data associated with the second wells, and may process the second well data and the pre-plunger lift installation data, with the one or more trained analytical models, to determine a set of performing wells, of the second wells, and a set of underperforming wells of the second wells. The one or more processors may process the third well data and data associated with the set of performing wells, with the one or more trained analytical models, to determine a first metric associated with the candidate well, and may process the third well data and data associated with the set of underperforming wells, with the one or more trained analytical models, to determine a second metric associated with the candidate well. The one or more processors may determine that plunger lift is to be installed in the candidate well based on the first metric and the second metric, and may perform one or more actions based on determining that plunger lift is to be installed in the candidate well.

According to some implementations, a non-transitory computer-readable medium may store instructions that include one or more instructions that, when executed by one or more processors, may cause the one or more processors to receive first well data associated with first wells where plunger lift is installed, wherein the first wells are located within a geographical area, and receive second well data associated with a candidate well where plunger lift is not installed, wherein the candidate well is located within the geographical area, and wherein the candidate well is a candidate for plunger lift installation. The one or more instructions may cause the one or more processors to process the first well data, with a first model and a second model, to determine pre-plunger lift installation data associated with the first wells, and process the first well data and the pre-plunger lift installation data, with a third model, to determine a set of performing wells, of the first wells, and a set of underperforming wells of the first wells. The one or more instructions may cause the one or more processors to process the second well data and data associated with the set of performing wells, with a fourth model, to determine a first metric associated with the candidate well, and process the second well data and data associated with the set of underperforming wells, with the fourth model, to determine a second metric associated with the candidate well. The one or more instructions may cause the one or more processors to determine whether to install plunger lift in the candidate well based on the first metric and the second metric, and perform one or more actions based on determining whether to install plunger lift in the candidate well.

BRIEF DESCRIPTION OF THE DRAWINGS

FIGS. 4-6 are flow charts of example processes for utilizing analytical models to identify wells in which to install plunger lift for improved well production.

DETAILED DESCRIPTION

Figure 1A:
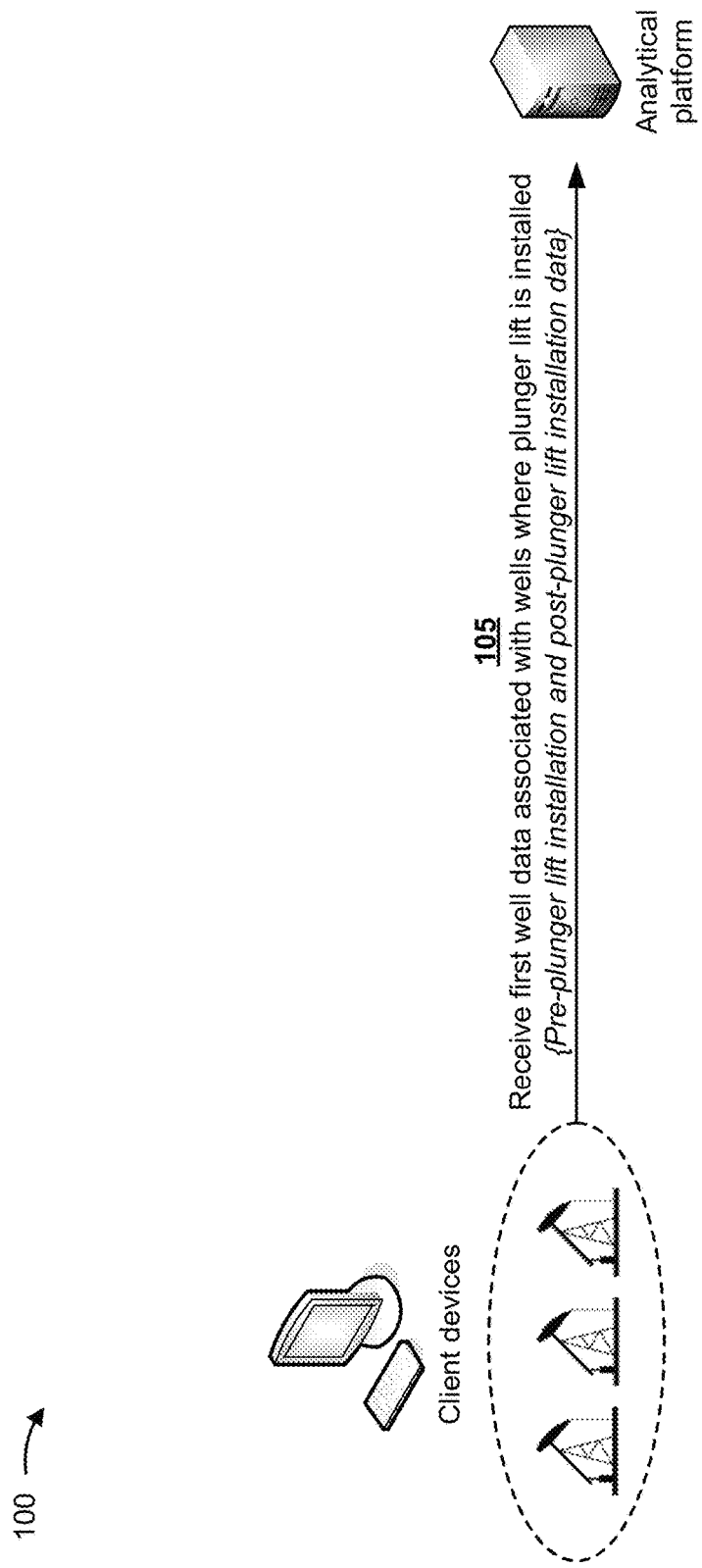
FIGS. 1A-1I are diagrams of one or more example implementations described herein.

The following detailed description of example implementations refers to the accompanying drawings. The same reference numbers in different drawings may identify the same or similar elements.

Plunger lift is an artificial lift process employed in mature gas wells (e.g., wells producing gas, such as natural gas) to eliminate liquid loading (or contaminant loading) and improve production performance. Liquid loading occurs in a well when a gas in the well is unable to transport liquids from the well due decreased production velocity. The production velocity in the well decreases because, as the well matures, a bottom hole pressure of the well decreases. Liquid accumulates in the well as a result of the bottom hole pressure decrease, which hinders gas production of the well. Plunger lift may be installed in a well experiencing liquid loading and may aid in removing liquid from the well.

However, plunger lift is not guaranteed to decrease liquid loading and improve gas production in a well, and there is no mechanism to identify wells that will experience improved gas production due to plunger lift. Thus, installing plunger lift in wells wastes resources (e.g., plungers, machinery used to install plunger lift, well production due to lost time installing plunger lift, and/or the like), computing resources (e.g., processing resources, memory resources, and/or the like), and/or the like when the wells do not experience significantly improved gas production.

Some implementations described herein provide an analytical platform that utilizes analytical models to identify wells in which to install plunger lift for improved well production. This plunger lift installation optimization technique assists in the improved well production. For example, the analytical platform may receive first well data associated with first wells where plunger lift is installed and that are located within a geographical area, and may receive second well data associated with a candidate well where plunger lift is not installed and that is located within the geographical area. The analytical platform may process the first well data, with a first model and a second model, to determine pre-plunger lift installation data associated with the first wells, and may process the first well data and the pre-plunger lift installation data, with a third model, to determine a set of performing wells, of the first wells, and a set of underperforming wells of the first wells. The analytical platform may process the second well data and data associated with the set of performing wells, with a fourth model, to determine a first metric associated with the candidate well, and may process the second well data and data associated with the set of underperforming wells, with the fourth model, to determine a second metric associated with the candidate well. The analytical platform may determine whether to install plunger lift in the candidate well based on the first metric and the second metric, and may perform one or more actions based on determining whether to install plunger lift in the candidate well.

In this way, the analytical platform identifies wells in which to install plunger lift for improved well production. Thus, the analytical platform may prevent installation of plunger lift in wells that do not experience improved gas production, which conserves resources (e.g., plunger lift, machinery used to install plunger lift, well production due to lost time installing plunger lift, and/or the like), computing resources (e.g., processing resources, memory resources, and/or the like), and/or the like that would otherwise be wasted installing plunger lift in such wells.

FIGS. 1A-1I are diagrams of one or more example implementations 100 described herein. As shown in FIG. 1A, client devices may be associated with wells (e.g., gas wells, liquid wells, and/or the like) and an analytical platform. In some implementations, the wells may include wells where plunger lift was installed. The client devices may receive well data regarding the wells before plunger lift was installed in the wells (e.g., referred to as pre-plunger lift installation data) and after plunger lift was installed in the wells (e.g., referred to as post-plunger lift installation data). The pre-plunger lift installation data and the post-plunger lift installation data may be referred to as first well data, and the wells shown in FIG. 1A may be referred to as first wells.

In some implementations, the first well data may include data identifying (e.g., pre-plunger installation and post-plunger installation) reservoir pressures associated with the first wells, casing pressures associated with the first wells, tubing pressures associated with the first wells, line pressures associated with the first wells, bottom hole pressures associated with the first wells, production rates associated with the first wells, deferments associated with the first wells, drawdowns associated with the first wells, production volumes associated with the first wells, production efficiencies associated with the first wells, well depths associated with the first wells, and/or the like.

As further shown in FIG. 1A, and by reference number 105, the analytical platform may receive, from the client devices, the first well data associated with the first wells where plunger lift is installed. In some implementations, the analytical platform may store the first well data in a data structure (e.g., a database, a table, a list, and/or the like) associated with the analytical platform. In some implementations, there may be hundreds, thousands, and/or the like, of first wells that produce thousands, millions, billions, and/or the like, of data points provided in the first well data. In this way, the analytical platform may handle thousands, millions, billions, and/or the like, of data points within a period of time (e.g., daily, weekly, monthly), and thus may provide "big data" capability.

Figure 1B:
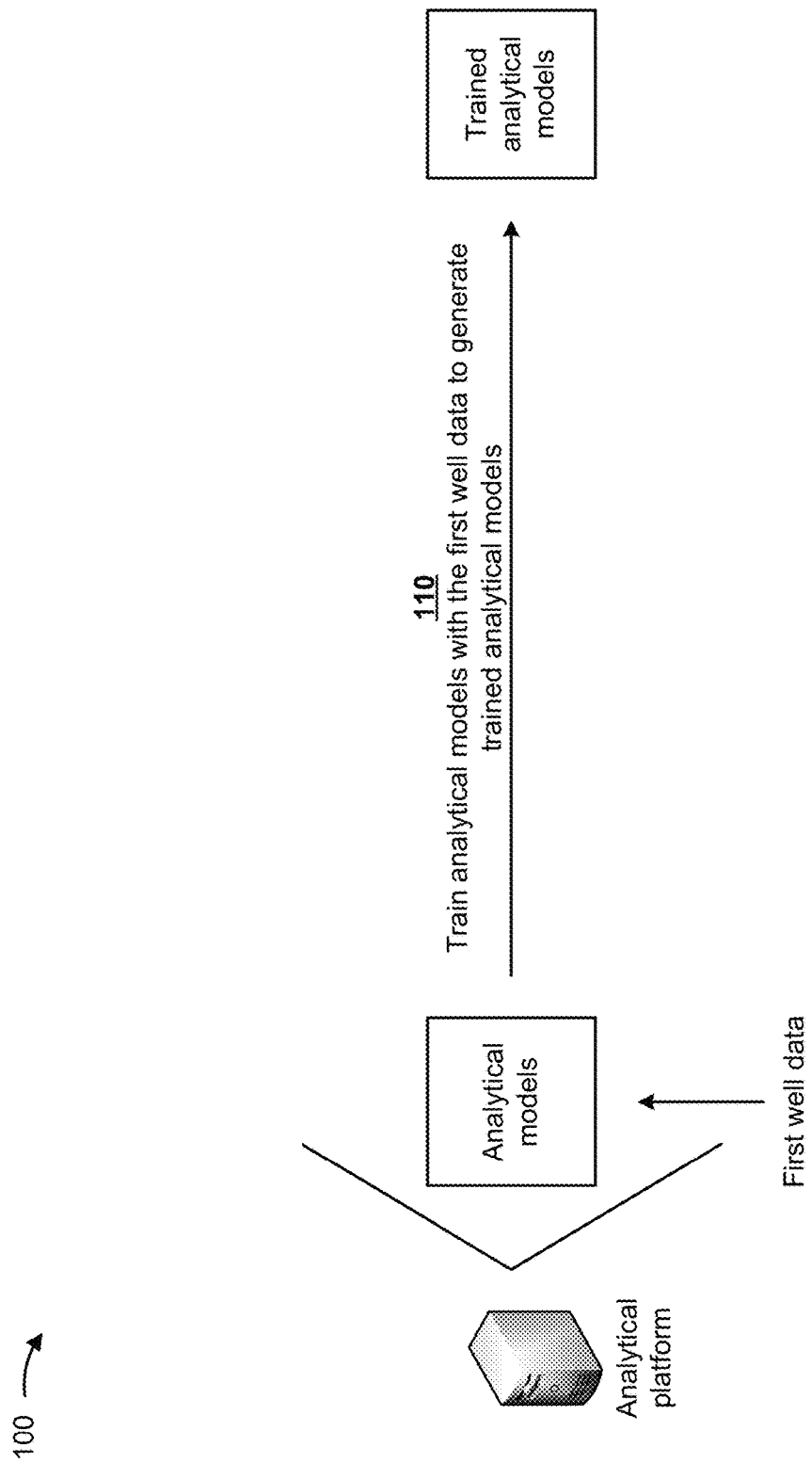

As shown in FIG. 1B, and by reference number 110, the analytical platform may train analytical models with the first well data to generate trained analytical models. In some implementations, the analytical models may include a correlation analysis model, a decision tree analysis model, a clustering model, a centroid calculation model, a Euclidean distance calculation model, and/or the like. The trained analytical models may be utilized by the analytical platform to identify wells in which to install plunger lift for improved well production.

In some implementations, the analytical platform may train the analytical models, with the first well data, to identify correlations, limits, and/or metrics associated with first well data parameters that correspond to performing and/or under-performing wells. For example, the analytical platform may separate the first well data into a training set, a validation set, a test set, and/or the like. The training set may be utilized to train the analytical models. The validation set may be utilized to validate results of the trained analytical models. The test set may be utilized to test operation of the analytical models.

In some implementations, the analytical platform may train the analytical models using, for example, an unsupervised training procedure and based on the first well data. For example, the analytical platform may perform dimensionality reduction to reduce the first well data to a minimum feature set, thereby reducing resources (e.g., processing resources, memory resources, and/or the like) to train the analytical models, and may apply a classification technique to the minimum feature set.

In some implementations, the analytical platform may use a logistic regression classification technique to determine a categorical outcome (e.g., that the first well data indicates that each of one or more wells, of the first wells, is performing or under-performing). Additionally, or alternatively, the analytical platform may use a naïve Bayesian classifier technique. In this case, the analytical platform may perform binary recursive partitioning to split the first well data into partitions and/or branches and use the partitions and/or branches to determine outcomes (e.g., that the first well data indicates that each of one or more wells, of the first wells, is performing or under-performing). Based on using recursive partitioning, the analytical platform may reduce utilization of computing resources relative to manual, linear sorting and analysis of data points, thereby enabling use of thousands, millions, or billions of data points to train the analytical models, which may result in a more accurate model than using fewer data points.

Additionally, or alternatively, the analytical platform may use a support vector machine (SVM) classifier technique to generate a non-linear boundary between data points in the training set. In this case, the non-linear boundary is used to classify test data into a particular class.

Additionally, or alternatively, the analytical platform may train the analytical models using a supervised training procedure that includes receiving input to the analytical models from a subject matter expert, which may reduce an amount of time, an amount of processing resources, and/or the like to train the analytical models relative to an unsupervised training procedure. In some implementations, the analytical platform may use one or more other model training techniques, such as a neural network technique, a latent semantic indexing technique, and/or the like. For example, the analytical platform may perform an artificial neural network processing technique (e.g., using a two-layer feedforward neural network architecture, a three-layer feedforward neural network architecture, and/or the like) to perform pattern recognition with regard to patterns of the first well data. In this case, using the artificial neural network processing technique may improve an accuracy of the trained analytical models generated by the analytical platform by being more robust to noisy, imprecise, or incomplete data, and by enabling the analytical platform to detect patterns and/or trends undetectable to human analysts or systems using less complex techniques.

Figure 1C:
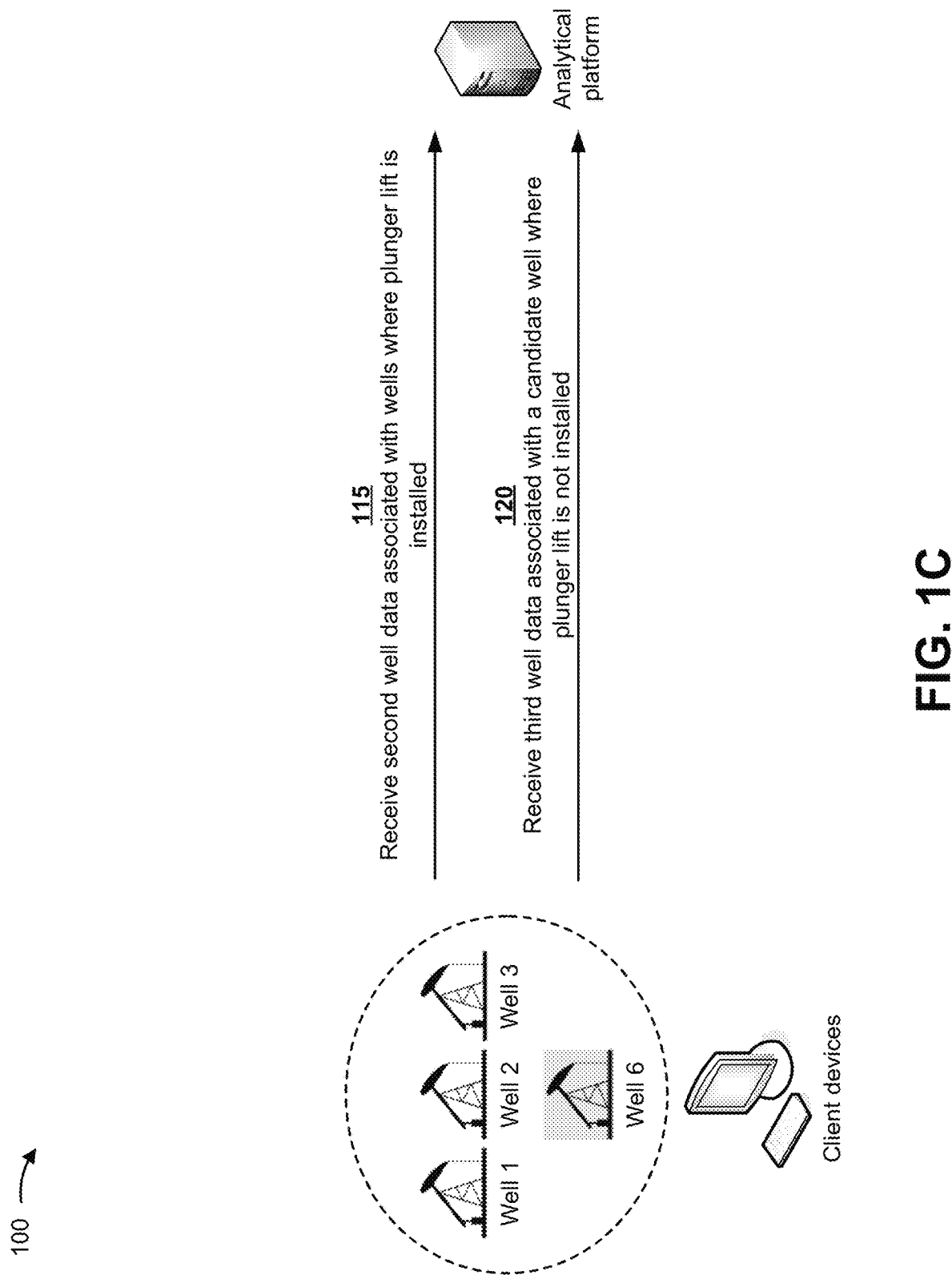

As shown in FIG. 1C, client devices may be associated with second wells, a candidate well, and the analytical platform. In some implementations, the second wells (e.g., Well 1, Well 2, and Well 3) may include wells where plunger lift was installed, and the candidate well (e.g., Well 6) may include a well that is a candidate for plunger lift installation. In some implementations, the second wells and the candidate well may be located within the same geographical area. The client devices may receive well data regarding the second wells before plunger lift was installed in the second wells (e.g., referred to as pre-plunger lift installation data) and after plunger lift was installed in the second wells (e.g., referred to as post-plunger lift installation data). The pre-plunger lift installation data and the post-plunger lift installation data may be referred to as second well data. One or more of the client devices may receive third well data from the candidate well.

In some implementations, the second well data may include data identifying (e.g., pre-plunger installation and post-plunger installation) reservoir pressures associated with the second wells, casing pressures associated with the second wells, tubing pressures associated with the second wells, line pressures associated with the second wells, bottom hole pressures associated with the second wells, production rates associated with the second wells, deferments associated with the second wells, drawdowns associated with the second wells, production volumes associated with the second wells, production efficiencies associated with the second wells, well depths associated with the second wells, and/or the like.

In some implementations, the third well data may include data identifying a reservoir pressure associated with the candidate well, a casing pressure associated with the candidate well, a tubing pressure associated with the candidate well, a line pressure associated with the candidate well, a bottom hole pressure associated with the candidate well, a production rate associated with the candidate well, a deferment associated with the candidate well, a drawdown associated with the candidate well, a production volume associated with the candidate well, a production efficiency associated with the candidate well, a well depth associated with the candidate well, and/or the like.

As further shown in FIG. 1C, and by reference number 115, the analytical platform may receive, from the client devices, the second well data associated with the second wells where plunger lift is installed. As further shown in FIG. 1C, and by reference number 120, the analytical platform may receive, from one or more of the client devices, the third well data associated with the candidate well.

In some implementations, the analytical platform may store the second well data and the third well data in a data structure (e.g., a database, a table, a list, and/or the like) associated with the analytical platform. In some implementations, there may be hundreds, thousands, and/or the like, of second wells and/or candidate wells that produce thousands, millions, billions, and/or the like, of data points provided in the second well data and/or the third well data. In this way, the analytical platform may handle thousands, millions, billions, and/or the like, of data points within a period of time (e.g., daily, weekly, monthly), and thus may provide "big data" capability.

Figure 1D:
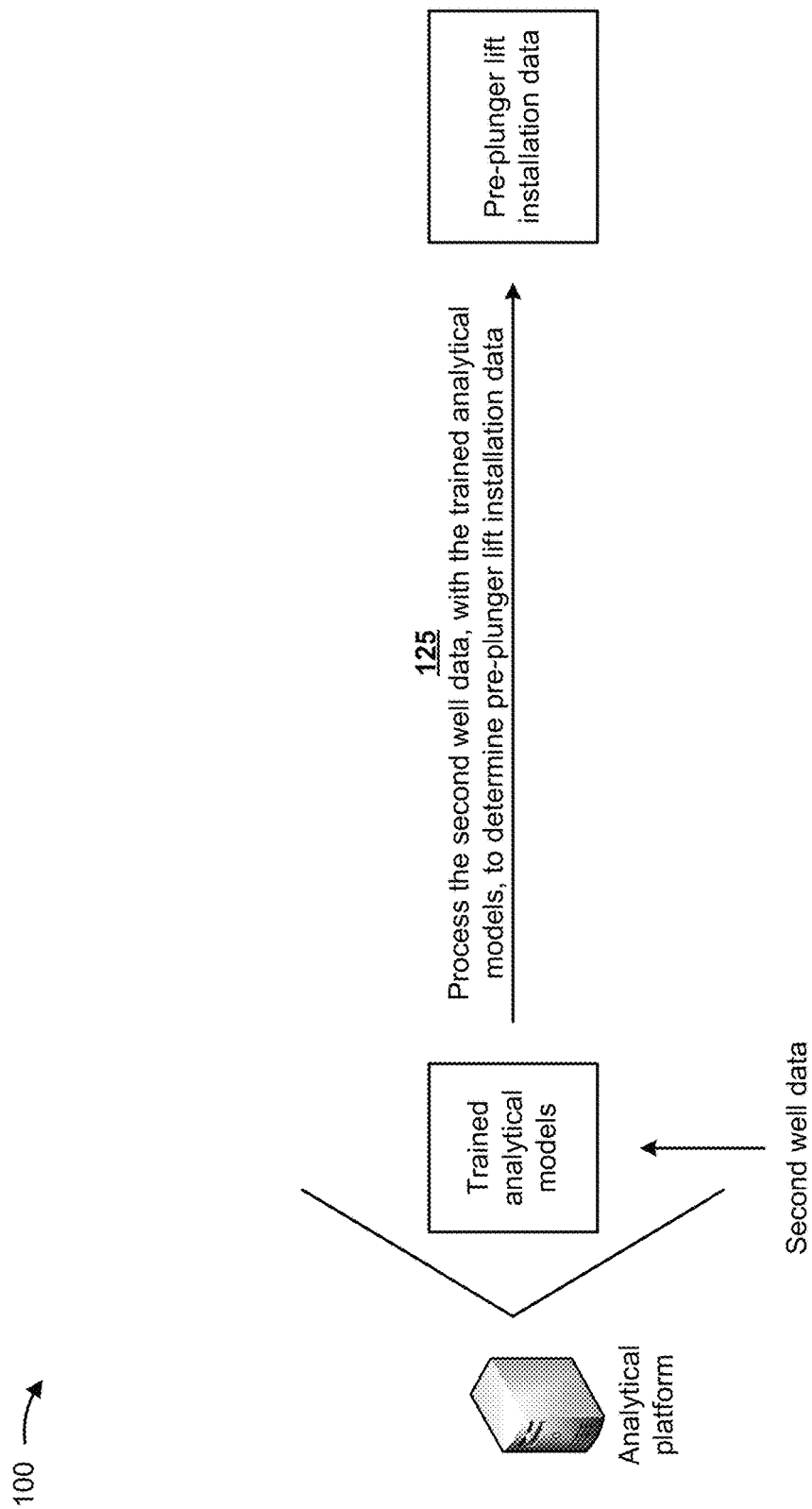

As shown in FIG. 1D, and by reference number 125, the analytical platform may process the second well data, with the trained analytical models, to determine pre-plunger lift installation data. In some implementations, the analytical platform may utilize a correlation analysis model (e.g., a Pearson correlation model, a Kendall rank correlation model, a Spearman correlation model, a Point-Biserial correlation model, and/or the like) with the second well data to determine the pre-plunger lift installation data. For example, the analytical platform may perform a correlation analysis on the second well data and may utilize production efficiency as a target variable in the correlation analysis. Based on the correlation analysis, the analytical platform may determine that production efficiency is highly correlated with particular parameters, such as production volume, production rate, drawdown, and differential pressure.

In some implementations, the analytical platform may utilize a decision tree analysis model (e.g., an iterative dichotomiser (ID3) model, a classification and regression tree (CART) model, a Chi-squared automatic interaction detector (CHAID) model, and/or the like) on the second well data to determine the pre-plunger lift installation data. For example, the analytical platform may perform a decision tree analysis on the second well data to determine limits associated with the particular parameters (e.g., to ensure a greatest production efficiency). Based on the decision tree analysis of the second well data, the analytical platform may determine that the production efficiency of the second wells may be within a particular range (e.g., from 0.55 to 0.86) when the drawdown of the second wells is greater than a particular pounds per square inch (psi) (e.g., 499 psi). The analytical platform may also determine that when the differential pressure of the second wells is less than a particular psi (e.g., 1.9 psi), the production efficiency of the second wells is approximately zero. Thus, based on the correlation analysis and the decision tree analysis, the analytical platform may determine that influencing parameters (e.g., the pre-plunger lift installation data) of the second well data may include drawdown, differential pressure, production volume, and well depth.

Figure 1E:
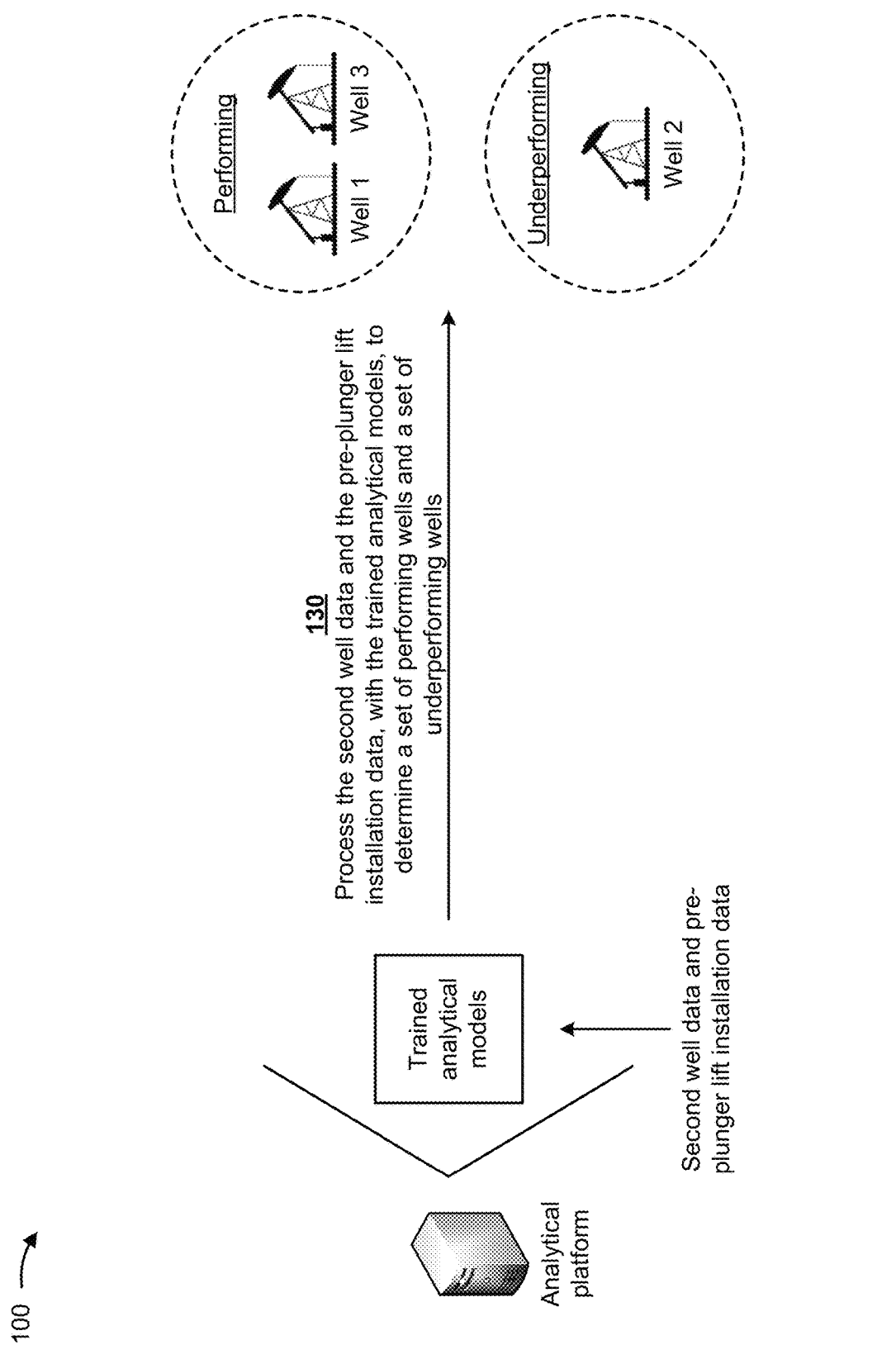

As shown in FIG. 1E, and by reference number 130, the analytical platform may process the second well data and the pre-plunger lift installation data, with the trained analytical models, to determine a set of performing wells, of the second wells, and a set of underperforming wells, of the second wells. For example, the analytical platform may perform a post-plunger lift analysis (e.g., a cluster analysis, such as a hierarchical clustering analysis, a centroid-based clustering analysis, a distribution-based clustering analysis, a density-based clustering analysis, and/or the like) on the second well data associated with the second wells (e.g., Well 1, Well 2 and Well 3). Based on the cluster analysis, the analytical platform may determine that production volume improvements of particular second wells (e.g., Well 1 and Well 3) is greater than a particular value threshold (e.g., 0.25) and that a production volume improvement for another particular second well (e.g., Well 2) is less than the particular value threshold. Thus, the analytical platform may group Well 1 and Well 3 in the set of performing wells and may group Well 2 in the set of under-performing wells. In some implementations, the analytical platform may group the second wells into the set of performing wells or the set of underperforming wells based on parameters provided in the second well data rather than based on the geographical area in which the second wells and the candidate well are located.

Figure 1F:
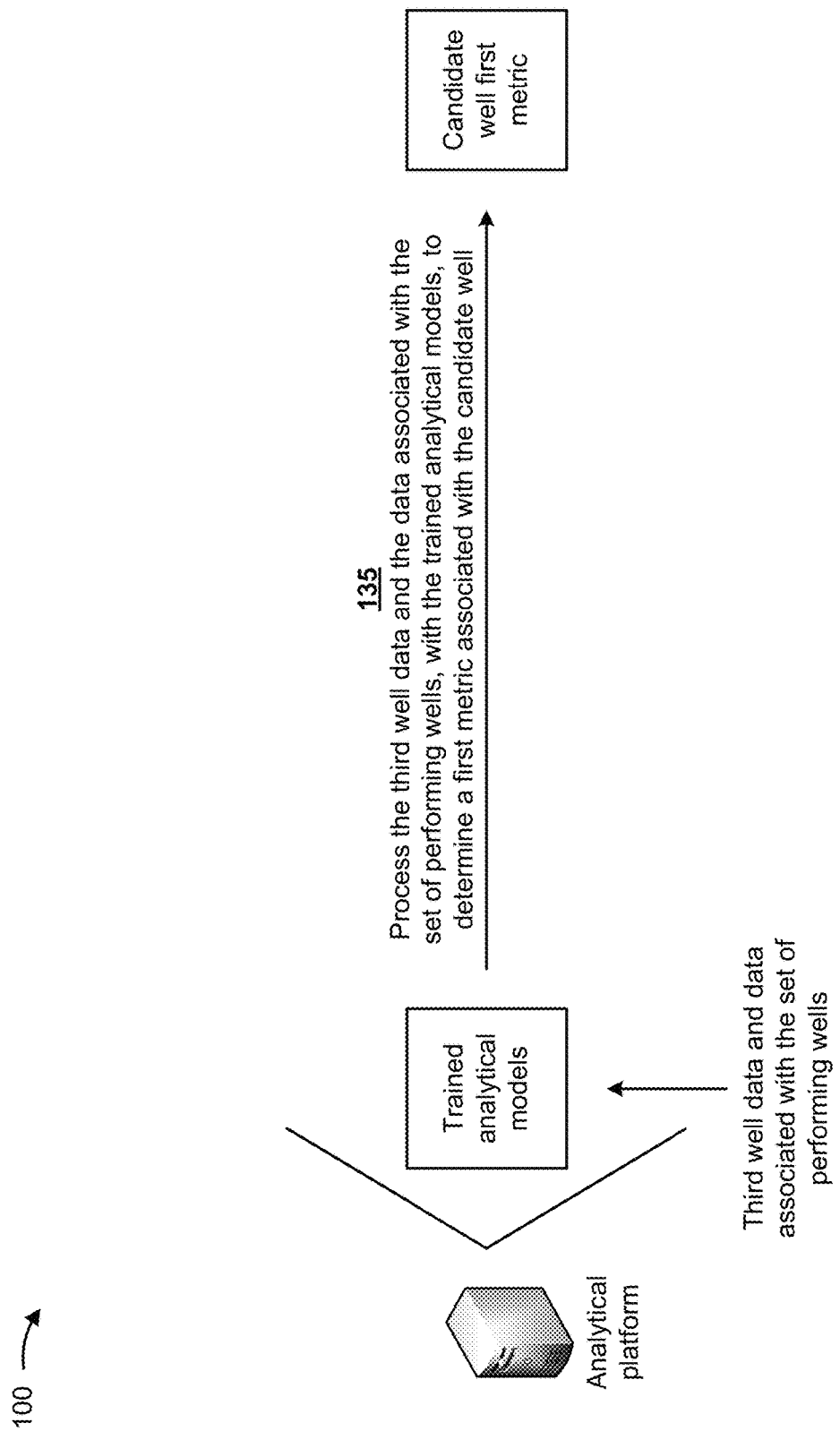

As shown in FIG. 1F, and by reference number 135, the analytical platform may process the third well data and the data associated with the set of performing wells (e.g., Well 1 and Well 3), with the trained analytical models, to determine a first metric associated with the candidate well. In some implementations, after grouping or clustering the second wells into the set of performing wells and the set of under-performing wells, the analytical platform may utilize a centroid calculation model to calculate a centroid of the set of performing wells for the influencing parameters (e.g., drawdown, differential pressure, production volume, and well depth). For example, for the set of performing wells, the centroid may include an average of each of the influencing parameters of Well 1 and Well 3:

$$x_{1p} = Centroid_{Drawdown} = \frac{Avg.\ of\ drawdown\ of\ Well\ 1 + Avg.\ of\ drawdown\ of\ Well\ 3}{2} = 103.528\ psi,$$

$$x_{2p} = Centroid_{DiffPress} = \frac{Avg.\ of\ diff.press.of\ Well\ 1 + Avg.\ of\ diff.press.of\ Well\ 3}{2} = 11.607\ psi,$$

$$x_{3p} = Centroid_{ProdVol} = \frac{Avg.\ of\ prod.vol.of\ Well\ 1 + Avg.\ of\ prod.vol.of\ Well\ 3}{2} = 153.78\ barrels/da,$$

$$x_{4p} = Centroid_{WellDepth} = \frac{Well\ depth\ of\ Well\ 1 + Well\ depth\ of\ Well\ 3}{2} = 2625\ feet.$$

In some implementations, the analytical platform may calculate the first metric (e.g., a first Euclidean distance) associated with the candidate well (e.g., Well 6) based on the centroid calculated for the set of performing wells. For example, for calculating the first Euclidean distance, values of the influencing parameters of Well 6 may include:

$x_1$=Drawdown of Well 6=123.72 psi, $x_2$=Differential pressure of Well 6=11.392 psi, $x_3$=Production volume of Well 6=153.42 barrels/day, $x_4$=Well depth of Well 6=2287 feet.

Therefore, the analytical platform may determine the first Euclidean distance ($X_p$) between the candidate well (e.g., Well 6) and the centroid calculated for the set of performing wells as follows:

$$X_p = \sqrt{(x_{1p}-x_1)^2+(x_{2p}-x_2)^2+(x_{3p}-x_3)^2+(x_{4p}-x_4)^2} = 338.603.$$

Figure 1G:
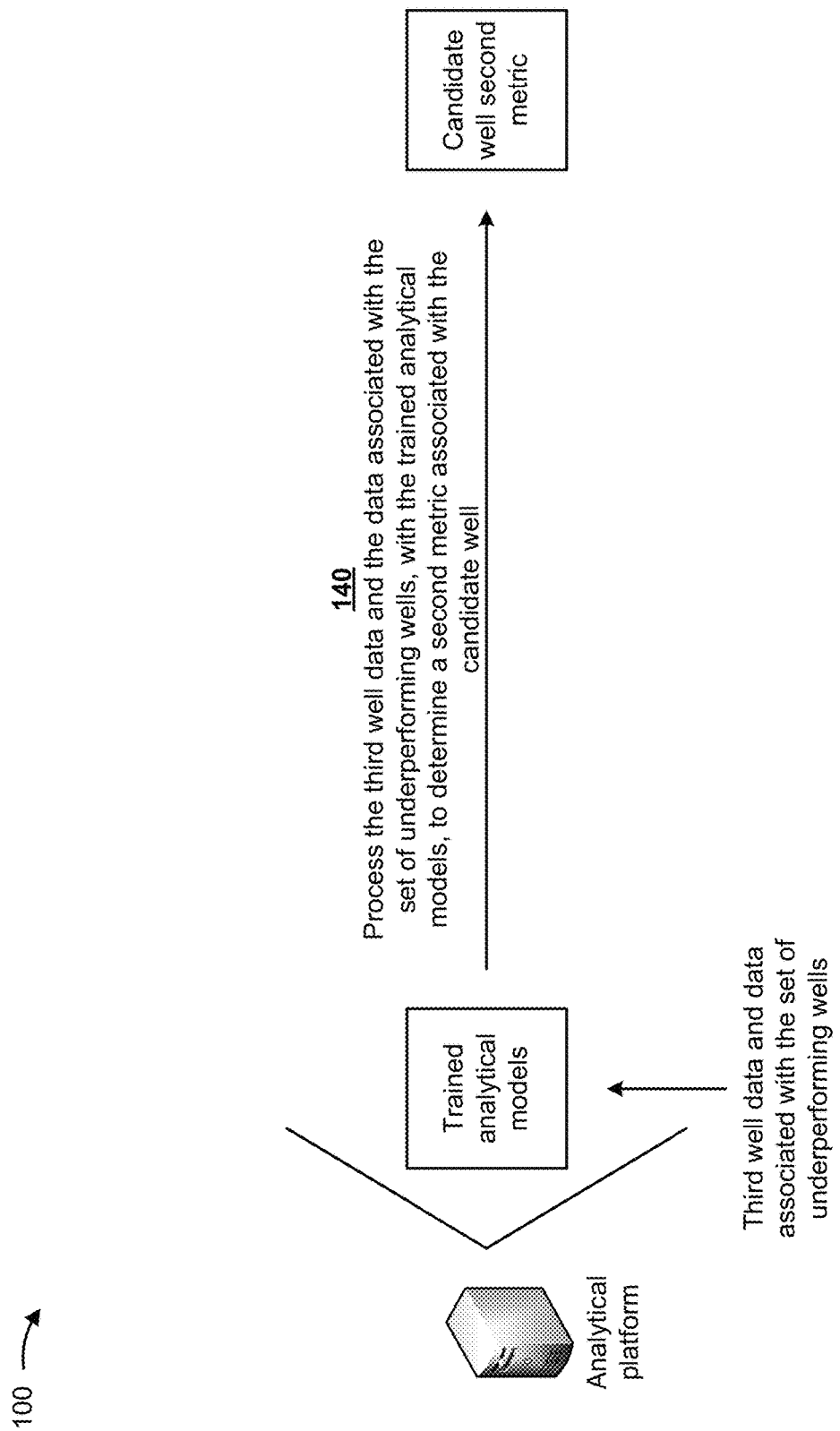

As shown in FIG. 1G, and by reference number 140, the analytical platform may process the third well data and the data associated with the set of underperforming wells, with the trained analytical models, to determine a second metric associated with the candidate well. In some implementations, after grouping or clustering the second wells into the set of performing wells and the set of under-performing wells, the analytical platform may utilize a centroid calculation model to calculate a centroid of the set of underperforming wells for the influencing parameters (e.g., drawdown, differential pressure, production volume, and well depth). For example, for the set of underperforming wells, the centroid may include an average of each of the influencing parameters of Well 2:

$x_{1u}$=Centroid$_{Drawdown}$=Average of drawdown of Well 2=105.393 psi, $x_{2u}$=Centroid$_{DiffPress}$=Average of differential pressure of Well 2=18.58 psi, $x_{3u}$=Centroid$_{ProdVol}$=Average of production volume of Well 2=247.24 barrels/day, $x_{4u}$=Centroid$_{WellDepth}$=Well depth of Well 2=2750 feet.

In some implementations, the analytical platform may calculate the second metric (e.g., a second Euclidean distance) associated with the candidate well (e.g., Well 6) based on the centroid calculated for the set of underperforming wells. For example, for calculating the second Euclidean distance, values of the influencing parameters of Well 6 may include:

$x_1$=Drawdown of Well 6=123.72 psi, $x_2$=Differential pressure of Well 6=11.392 psi, $x_3$=Production volume of Well 6=153.42 barrels/day, $x_4$=Well depth of Well 6=2287 feet.

Therefore, the analytical platform may determine the second Euclidean distance ($X_u$) between the candidate well (e.g., Well 6) and the centroid calculated for the set of underperforming wells as follows:

$$X_u = \sqrt{(x_{1u}-x_1)^2+(x_{2u}-x_2)^2+(x_{3u}-x_3)^2+(x_{4u}-x_4)^2} = 472.82.$$

Figure 1H:
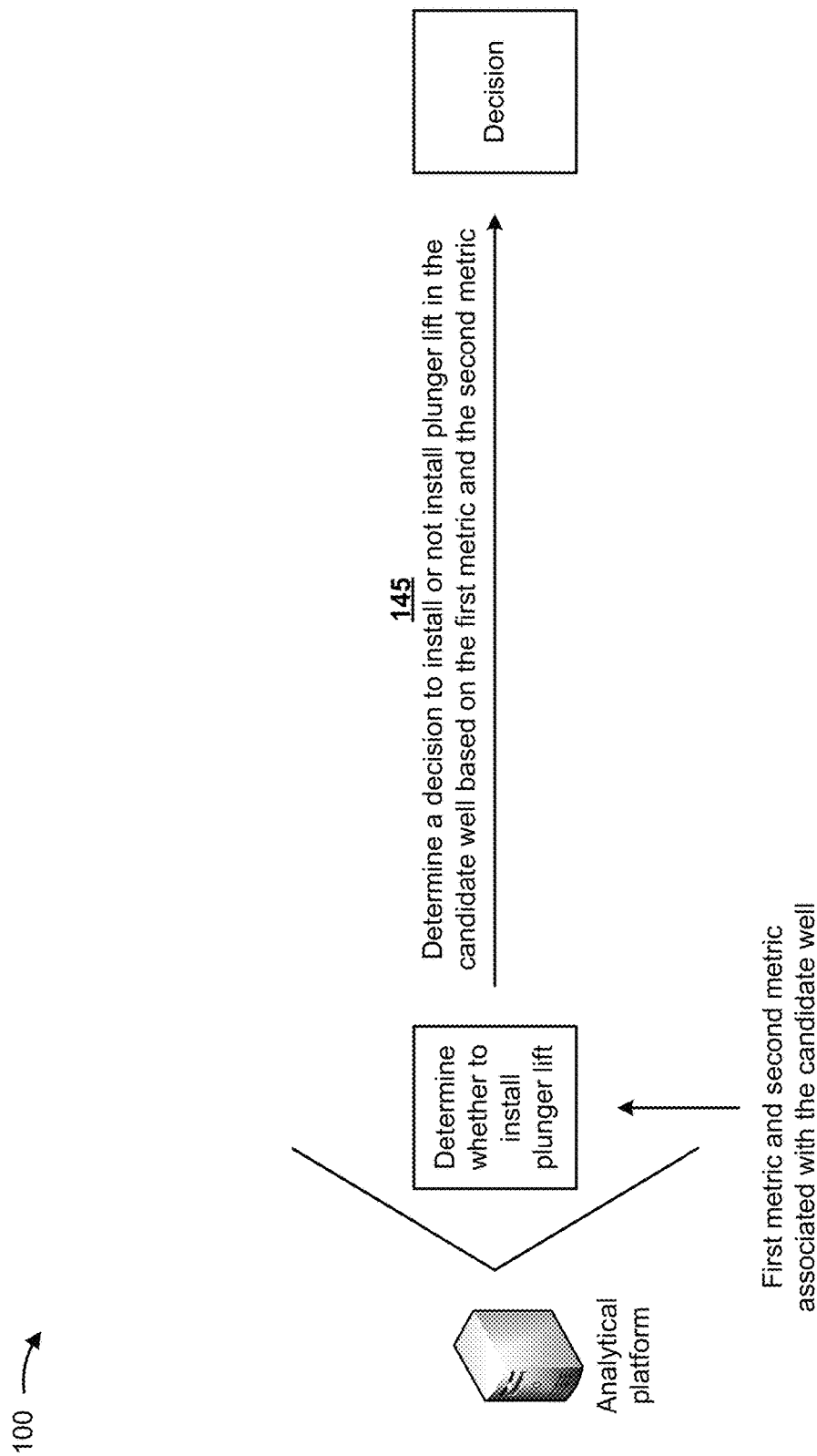

As shown in FIG. 1H, and by reference number 145, the analytical platform may determine a decision to install or not install plunger lift in the candidate well based on the first metric and the second metric. In some implementations, the analytical platform may determine to install plunger lift in the candidate well when the first Euclidean distance (e.g., $X_p$ associated with the set of performing wells) is less than or equal to the second Euclidean distance (e.g., $X_u$ associated with the set of underperforming wells). In some implementations, the analytical platform may determine to not install plunger lift in the candidate well when the first Euclidean distance (e.g., $X_p$) is greater than the second Euclidean distance (e.g., $X_u$). In other words, if $X_p \leq X_u$, the analytical platform may recommend plunger lift installation in the candidate well; and if $X_p > X_u$, the analytical platform may not recommend plunger lift installation in the candidate well. For the above example of Well 6, since as $X_p = 338.603 < X_u = 472.82$, the analytical platform may determine that Well 6 will perform similarly to the set of performing wells when plunger lift is installed, and, thus, may recommend plunger lift installation in Well 6.

Figure 1I:
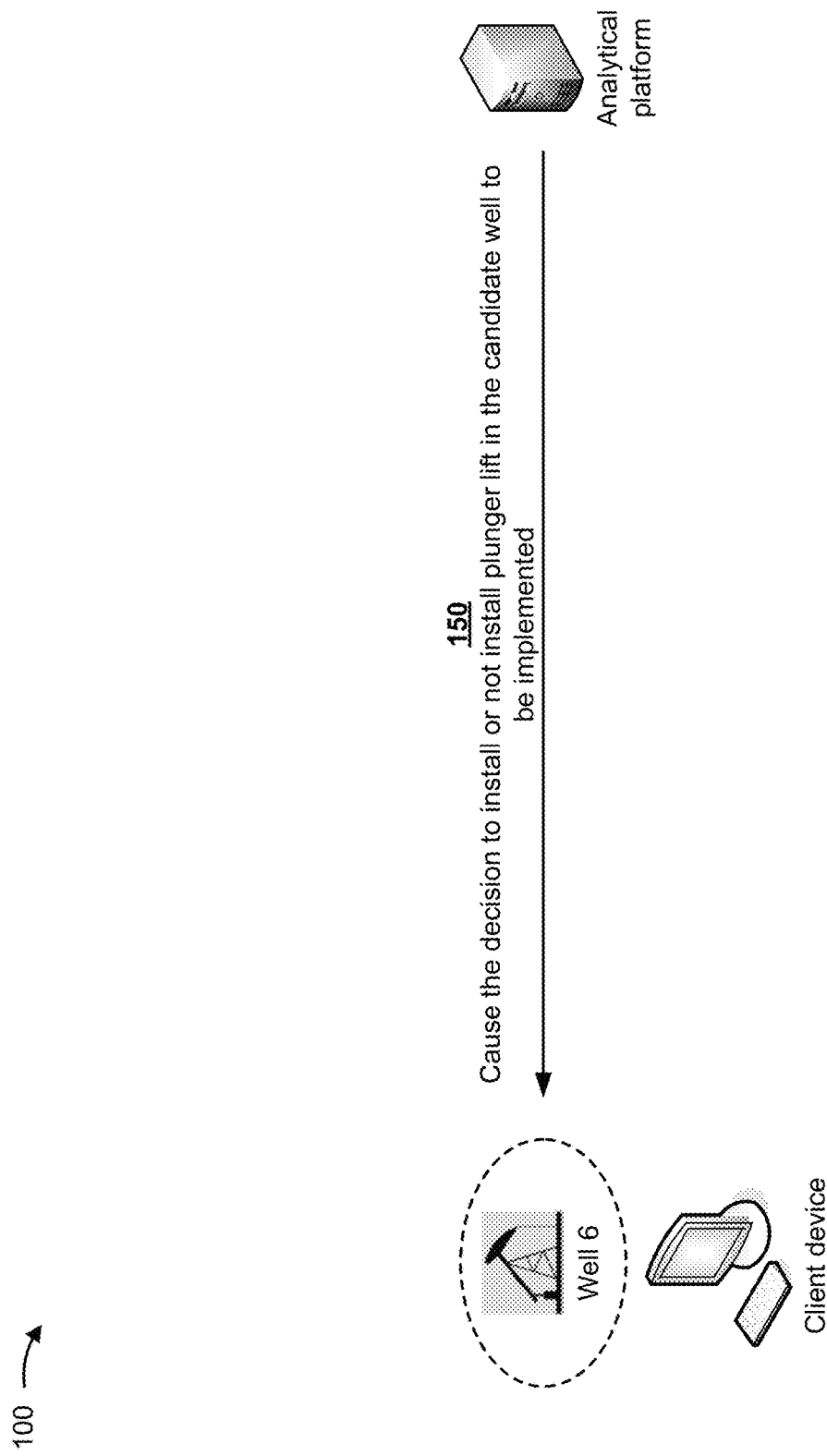

As shown in FIG. 1I, and by reference number 150, the analytical platform may cause the decision to install or not install plunger lift in the candidate well to be implemented. In some implementations, the analytical platform may perform one or more actions based on the decision to install or not install plunger lift in the candidate well.

For example, the one or more actions may include the analytical platform providing, to a client device, information indicating whether to install plunger lift in the candidate well. The client device may display the information to a user (e.g., a production engineer) of the client device so that the user can make an informed decision on whether to install plunger lift in the candidate well. In this way, the analytical platform prevents wasting of resources for installing plunger lift in a candidate well that will not benefit from plunger lift.

The one or more actions may include the analytical platform causing, when it is determined to install plunger lift in the candidate well, equipment (e.g., robots, drones, excavating equipment, and/or the like) to be dispatched, to the candidate well, for installing plunger lift in the candidate well. In this way, the analytical platform may cause plunger lift to be installed in the candidate well more quickly, which enables the candidate well to more efficiently operate more quickly.

The one or more actions may include the analytical platform causing a plunger to be ordered for the candidate well when it is determined to install plunger lift in the candidate well. In this way, the analytical platform may cause plunger lift to be installed in the candidate well more quickly, which enables the candidate well to more efficiently operate more quickly.

The one or more actions may include the analytical platform retraining the one or more analytical models based on the information indicating whether to install plunger lift in the candidate well. In this way, the analytical platform may improve the accuracy of the one or more analytical models so that the analytical models may more correctly identify wells in which to install plunger lift for improved well production.

The one or more actions may include the analytical platform causing a plunger to be ordered for the candidate well, and causing, when the plunger is received, equipment to be dispatched, to the candidate well, for installing plunger lift in the candidate well. In this way, the analytical platform may cause plunger lift to be installed in the candidate well more quickly, which enables the candidate well to more efficiently operate more quickly.

The one or more actions may include the analytical platform determining a probability of increasing production of the candidate well when plunger lift is installed in the candidate well, and providing, to a client device, information indicating the probability of increasing the production of the candidate well. The client device may display the information to a user (e.g., a production engineer) of the client device so that the user can make an informed decision on whether to install plunger lift in the candidate well. In this way, the analytical platform prevents wasting of resources for installing plunger lift in a candidate well that will not sufficiently benefit from plunger lift.

The one or more actions may include the analytical platform determining an expected increase in production of the candidate well when plunger lift is installed in the candidate well, providing, to a client device, information indicating the expected increase in the production of the candidate well, receiving, from the client device, a response indicating that plunger lift is to be installed in the candidate well, and causing plunger lift to be installed in the candidate well based on the response. In this way, the analytical platform may cause plunger lift to be installed in the candidate well more quickly, which enables the candidate well to more efficiently operate more quickly.

As indicated above, FIGS. 1A-1I are provided merely as examples. Other examples may differ from what is described with regard to FIGS. 1A-1I.

Figure 2:
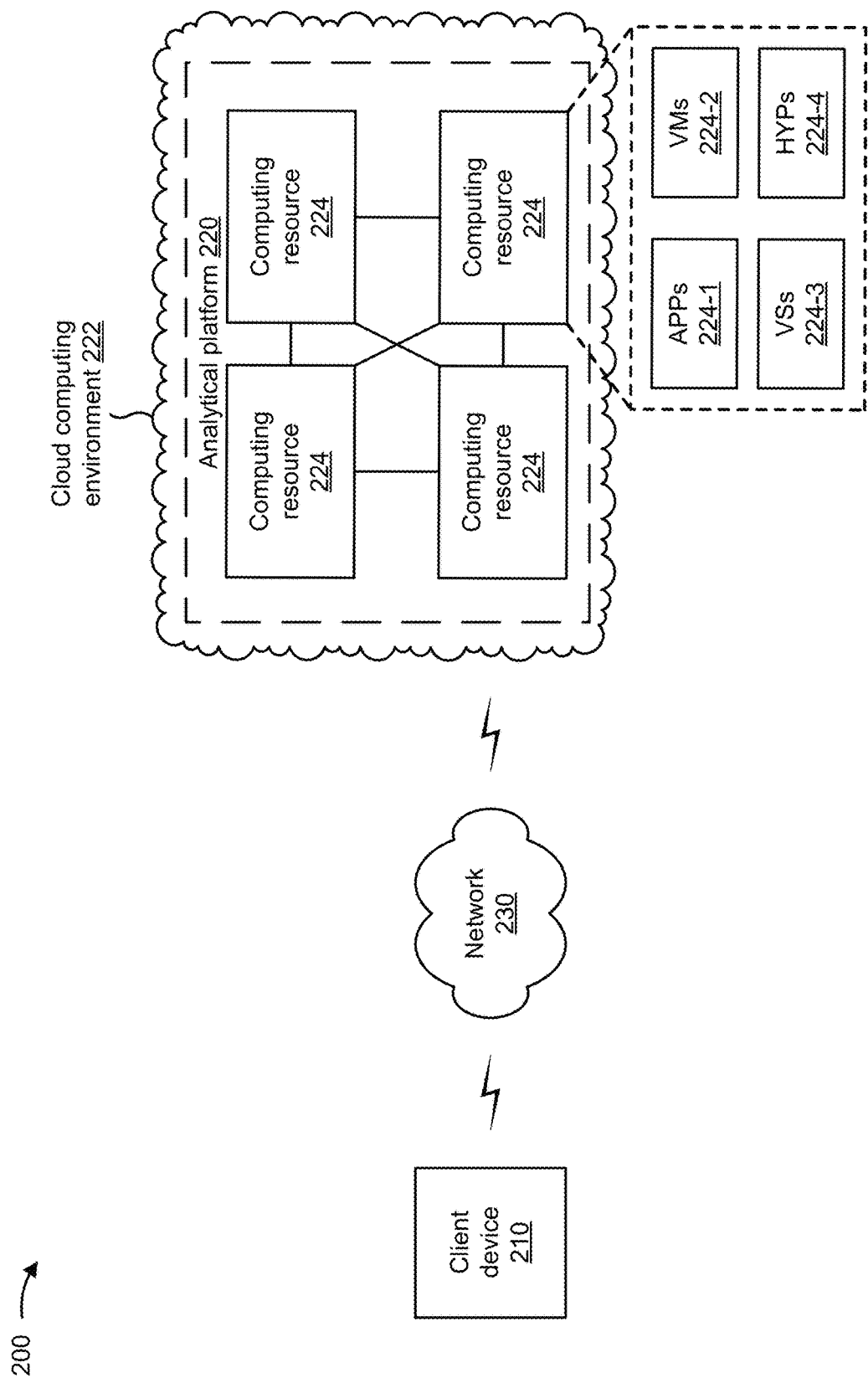
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a client device 210, an analytical platform 220, and a network 230. Devices of environment 200 may interconnect via wired connections, wireless connections, or a combination of wired and wireless connections.

Client device 210 includes one or more devices capable of receiving, generating, storing, processing, and/or providing information, such as information described herein. For example, client device 210 may include a mobile phone (e.g., a smart phone, a radiotelephone, etc.), a laptop computer, a tablet computer, a desktop computer, a handheld computer, a gaming device, a wearable communication device (e.g., a smart watch, a pair of smart glasses, a heart rate monitor, a fitness tracker, smart clothing, smart jewelry, a head mounted display, etc.), or a similar type of device. In some implementations, client device 210 may receive information from and/or transmit information to analytical platform 220.

Analytical platform 220 includes one or more devices that utilize analytical models to identify wells in which to install plunger lift for improved well production. In some implementations, analytical platform 220 may be designed to be modular such that certain software components may be swapped in or out depending on a particular need. As such, analytical platform 220 may be easily and/or quickly reconfigured for different uses. In some implementations, analytical platform 220 may receive information from and/or transmit information to one or more client devices 210.

In some implementations, as shown, analytical platform 220 may be hosted in a cloud computing environment 222. Notably, while implementations described herein describe analytical platform 220 as being hosted in cloud computing environment 222, in some implementations, analytical platform 220 may not be cloud-based (i.e., may be implemented outside of a cloud computing environment) or may be partially cloud-based.

Cloud computing environment 222 includes an environment that hosts analytical platform 220. Cloud computing environment 222 may provide computation, software, data access, storage, etc., services that do not require end-user knowledge of a physical location and configuration of system(s) and/or device(s) that hosts analytical platform 220. As shown, cloud computing environment 222 may include a group of computing resources 224 (referred to collectively as "computing resources 224" and individually as "computing resource 224").

Computing resource 224 includes one or more personal computers, workstation computers, mainframe devices, or other types of computation and/or communication devices. In some implementations, computing resource 224 may host analytical platform 220. The cloud resources may include compute instances executing in computing resource 224, storage devices provided in computing resource 224, data transfer devices provided by computing resource 224, etc. In some implementations, computing resource 224 may communicate with other computing resources 224 via wired connections, wireless connections, or a combination of wired and wireless connections.

As further shown in FIG. 2, computing resource 224 includes a group of cloud resources, such as one or more applications ("APPs") 224-1, one or more virtual machines ("VMs") 224-2, virtualized storage ("VSs") 224-3, one or more hypervisors ("HYPs") 224-4, and/or the like.

Application 224-1 includes one or more software applications that may be provided to or accessed by client device 210. Application 224-1 may eliminate a need to install and execute the software applications on client device 210. For example, application 224-1 may include software associated with analytical platform 220 and/or any other software capable of being provided via cloud computing environment 222. In some implementations, one application 224-1 may send/receive information to/from one or more other applications 224-1, via virtual machine 224-2.

Virtual machine 224-2 includes a software implementation of a machine (e.g., a computer) that executes programs like a physical machine. Virtual machine 224-2 may be either a system virtual machine or a process virtual machine, depending upon use and degree of correspondence to any real machine by virtual machine 224-2. A system virtual machine may provide a complete system platform that supports execution of a complete operating system ("OS"). A process virtual machine may execute a single program and may support a single process. In some implementations, virtual machine 224-2 may execute on behalf of a user (e.g., a user of client device 210 or an operator of analytical platform 220), and may manage infrastructure of cloud computing environment 222, such as data management, synchronization, or long-duration data transfers.

Virtualized storage 224-3 includes one or more storage systems and/or one or more devices that use virtualization techniques within the storage systems or devices of computing resource 224. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 224-4 may provide hardware virtualization techniques that allow multiple operating systems (e.g., "guest operating systems") to execute concurrently on a host computer, such as computing resource 224. Hypervisor 224-4 may present a virtual operating platform to the guest operating systems and may manage the execution of the guest operating systems. Multiple instances of a variety of operating systems may share virtualized hardware resources.

Network 230 includes one or more wired and/or wireless networks. For example, network 230 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
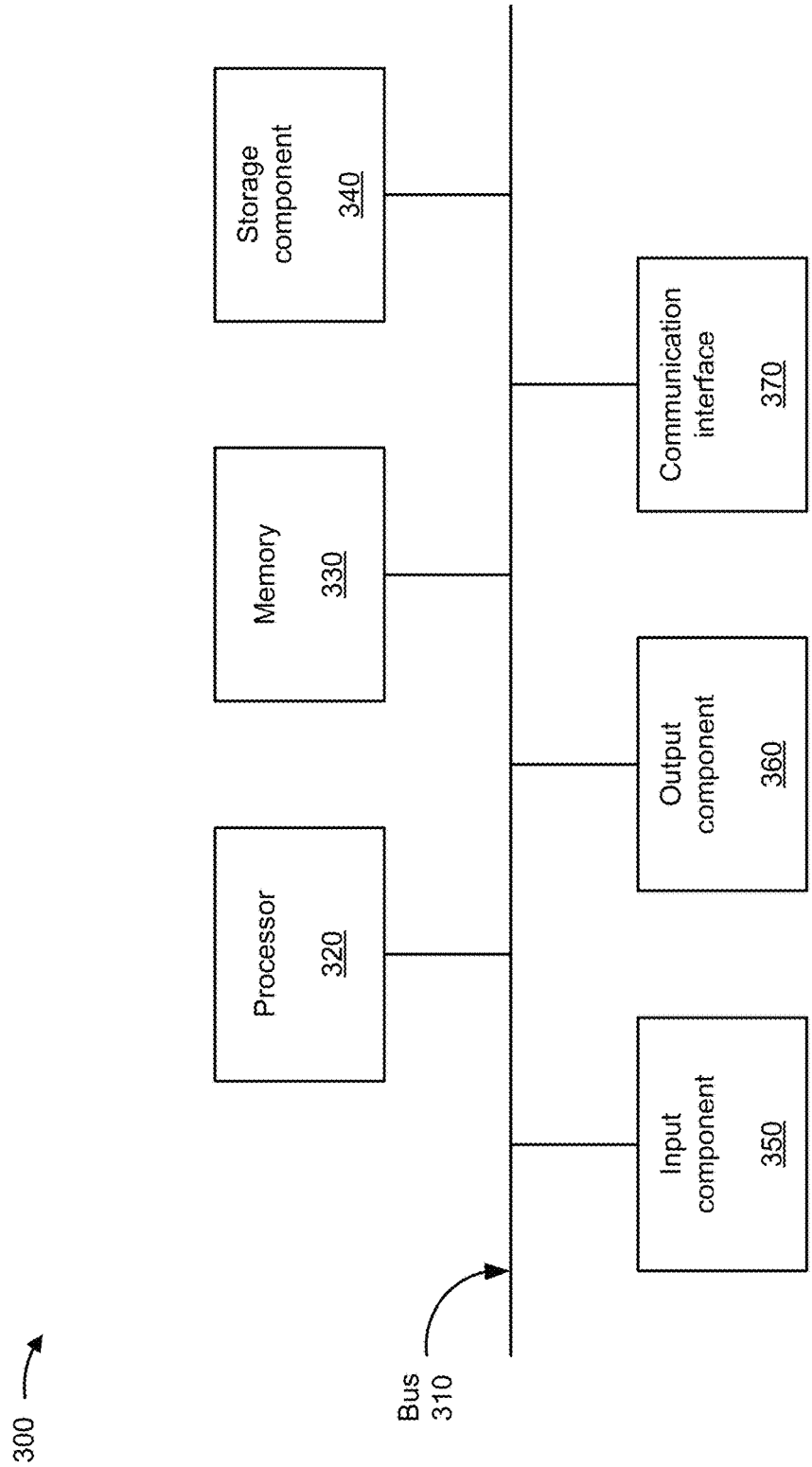
FIG. 3 is a diagram of example components of one or more devices of FIG. 2.

FIG. 3 is a diagram of example components of a device 300. Device 300 may correspond to client device 210, analytical platform 220, and/or computing resource 224. In some implementations, client device 210, analytical platform 220, and/or computing resource 224 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random-access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid-state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, and/or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
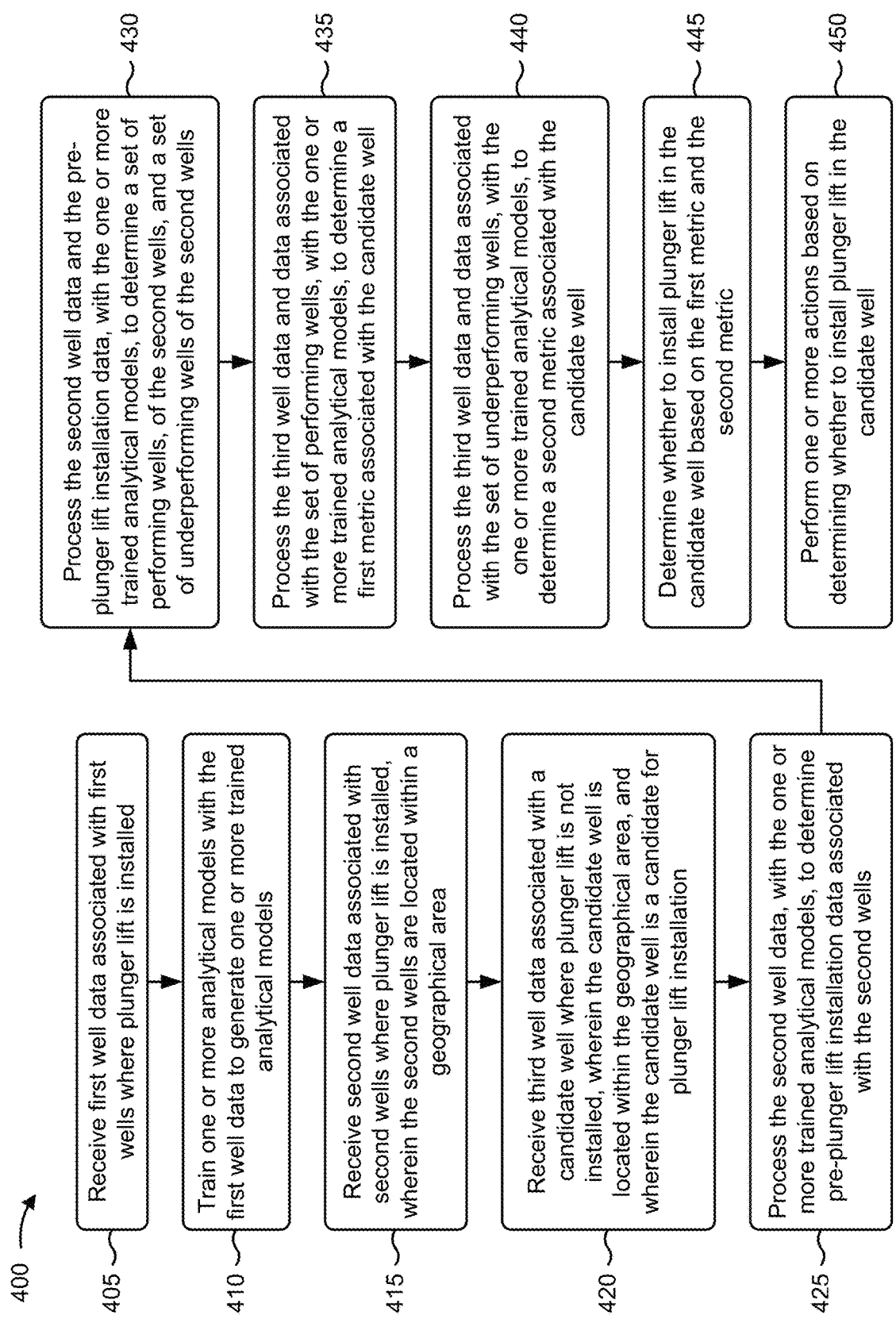

FIG. 4 is a flow chart of an example process 400 for utilizing analytical models to identify wells in which to install plunger lift for improved well production. In some implementations, one or more process blocks of FIG. 4 may be performed by an analytical platform (e.g., analytical platform 220). In some implementations, one or more process blocks of FIG. 4 may be performed by another device or a group of devices separate from or including the analytical platform, such as a client device (e.g., client device 210).

As shown in FIG. 4, process 400 may include receiving first well data associated with first wells where plunger lift is installed (block 405). For example, the analytical platform (e.g., using computing resource 224, processor 320, communication interface 370, and/or the like) may receive first well data associated with first wells where plunger lift is installed, as described above in connection with FIGS. 1A-3.

As further shown in FIG. 4, process 400 may include training one or more analytical models with the first well data to generate one or more trained analytical models (block 410). For example, the analytical platform (e.g., using computing resource 224, processor 320, memory 330, and/or the like) may train one or more analytical models with the first well data to generate one or more trained analytical models, as described above in connection with FIGS. 1A-3.

As further shown in FIG. 4, process 400 may include receiving second well data associated with second wells where plunger lift is installed, wherein the second wells are located within a geographical area (block 415). For example, the analytical platform (e.g., using computing resource 224, processor 320, communication interface 370, and/or the like) may receive second well data associated with second wells where plunger lift is installed, as described above in connection with FIGS. 1A-3. In some aspects, the second wells may be located within a geographical area.

As further shown in FIG. 4, process 400 may include receiving third well data associated with a candidate well where plunger lift is not installed, wherein the candidate well is located within the geographical area and wherein the candidate well is a candidate for plunger lift installation (block 420). For example, the analytical platform (e.g., using computing resource 224, processor 320, communication interface 370, and/or the like) may receive third well data associated with a candidate well where plunger lift is not installed, as described above in connection with FIGS. 1A-3. In some aspects, the candidate well may be located within the geographical area, and may be a candidate for plunger lift installation.

As further shown in FIG. 4, process 400 may include processing the second well data, with the one or more trained analytical models, to determine pre-plunger lift installation data associated with the second wells (block 425). For example, the analytical platform (e.g., using computing resource 224, processor 320, storage component 340, and/or the like) may process the second well data, with the one or more trained analytical models, to determine pre-plunger lift installation data associated with the second wells, as described above in connection with FIGS. 1A-3.

As further shown in FIG. 4, process 400 may include processing the second well data and the pre-plunger lift installation data, with the one or more trained analytical models, to determine a set of performing wells, of the second wells, and a set of underperforming wells of the second wells (block 430). For example, the analytical platform (e.g., using computing resource 224, processor 320, memory 330, and/or the like) may process the second well data and the pre-plunger lift installation data, with the one or more trained analytical models, to determine a set of performing wells, of the second wells, and a set of underperforming wells of the second wells, as described above in connection with FIGS. 1A-3.

As further shown in FIG. 4, process 400 may include processing the third well data and data associated with the set of performing wells, with the one or more trained analytical models, to determine a first metric associated with the candidate well (block 435). For example, the analytical platform (e.g., using computing resource 224, processor 320, storage component 340, and/or the like) may process the third well data and data associated with the set of performing wells, with the one or more trained analytical models, to determine a first metric associated with the candidate well, as described above in connection with FIGS. 1A-3.

As further shown in FIG. 4, process 400 may include processing the third well data and data associated with the set of underperforming wells, with the one or more trained analytical models, to determine a second metric associated with the candidate well (block 440). For example, the analytical platform (e.g., using computing resource 224, processor 320, memory 330, and/or the like) may process the third well data and data associated with the set of underperforming wells, with the one or more trained analytical models, to determine a second metric associated with the candidate well, as described above in connection with FIGS. 1A-3.

As further shown in FIG. 4, process 400 may include determining whether to install plunger lift in the candidate well based on the first metric and the second metric (block 445). For example, the analytical platform (e.g., using computing resource 224, processor 320, storage component 340, and/or the like) may determine whether to install plunger lift in the candidate well based on the first metric and the second metric, as described above in connection with FIGS. 1A-3.

As further shown in FIG. 4, process 400 may include performing one or more actions based on determining whether to install plunger lift in the candidate well (block 450). For example, the analytical platform (e.g., using computing resource 224, processor 320, memory 330, storage component 340, communication interface 370, and/or the like) may perform one or more actions based on determining whether to install plunger lift in the candidate well, as described above in connection with FIGS. 1A-3.

Process 400 may include additional implementations, such as any single implementation or any combination of implementations described below and/or in connection with one or more other processes described elsewhere herein.

In some implementations, when performing the one or more actions, the analytical platform may provide, to a client device, information indicating whether to install plunger lift in the candidate well; may cause, when it is determined to install plunger lift in the candidate well, equipment to be dispatched, to the candidate well, for installing plunger lift in the candidate well; may cause a plunger to be ordered for the candidate well when it is determined to install plunger lift in the candidate well; may retrain the one or more analytical models based on the information indicating whether to install plunger lift in the candidate well, and/or the like.

In some implementations, when processing the second well data, with the one or more trained analytical models, to determine the pre-plunger lift installation data, the analytical platform may perform a correlation analysis on the second well data to determine a correlation between parameters of the second well data; may perform, based on the correlation between the parameters, a decision tree analysis on the second well data to determine particular parameters of the parameters of the second well data; and may determine the pre-plunger lift installation data based on the particular parameters.

In some implementations, when processing the second well data and the pre-plunger lift installation data, with the one or more trained analytical models, to determine the set of performing wells and the set of underperforming wells, the analytical platform may group a portion of the second wells into the set of performing wells based on particular parameters associated with the second well data, and may group a remaining portion of the second wells into the set of underperforming wells based on the particular parameters associated with the second well data.

In some implementations, when processing the third well data and data associated with the set of performing wells, with the one or more trained analytical models, to determine the first metric associated with the candidate well, the analytical platform may calculate a first centroid associated with the set of performing wells based on the data associated with the set of performing wells, and may calculate a first Euclidean distance between particular parameters associated with the third well data and the first centroid associated with the set of performing wells.

In some implementations, when processing the third well data and data associated with the set of underperforming wells, with the one or more trained analytical models, to determine the second metric associated with the candidate well, the analytical platform may calculate a second centroid associated with the set of underperforming wells based on the data associated with the set of underperforming wells, and may calculate a second Euclidean distance between particular parameters associated with the third well data and the second centroid associated with the set of underperforming wells.

In some implementations, when determining whether to install plunger lift in the candidate well based on the first metric and the second metric, the analytical platform may determine that plunger lift is to be installed in the candidate well when the first Euclidean distance is less than or equal to the second Euclidean distance, and may determine that plunger lift is not to be installed in the candidate well when the first Euclidean distance is greater than the second Euclidean distance.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
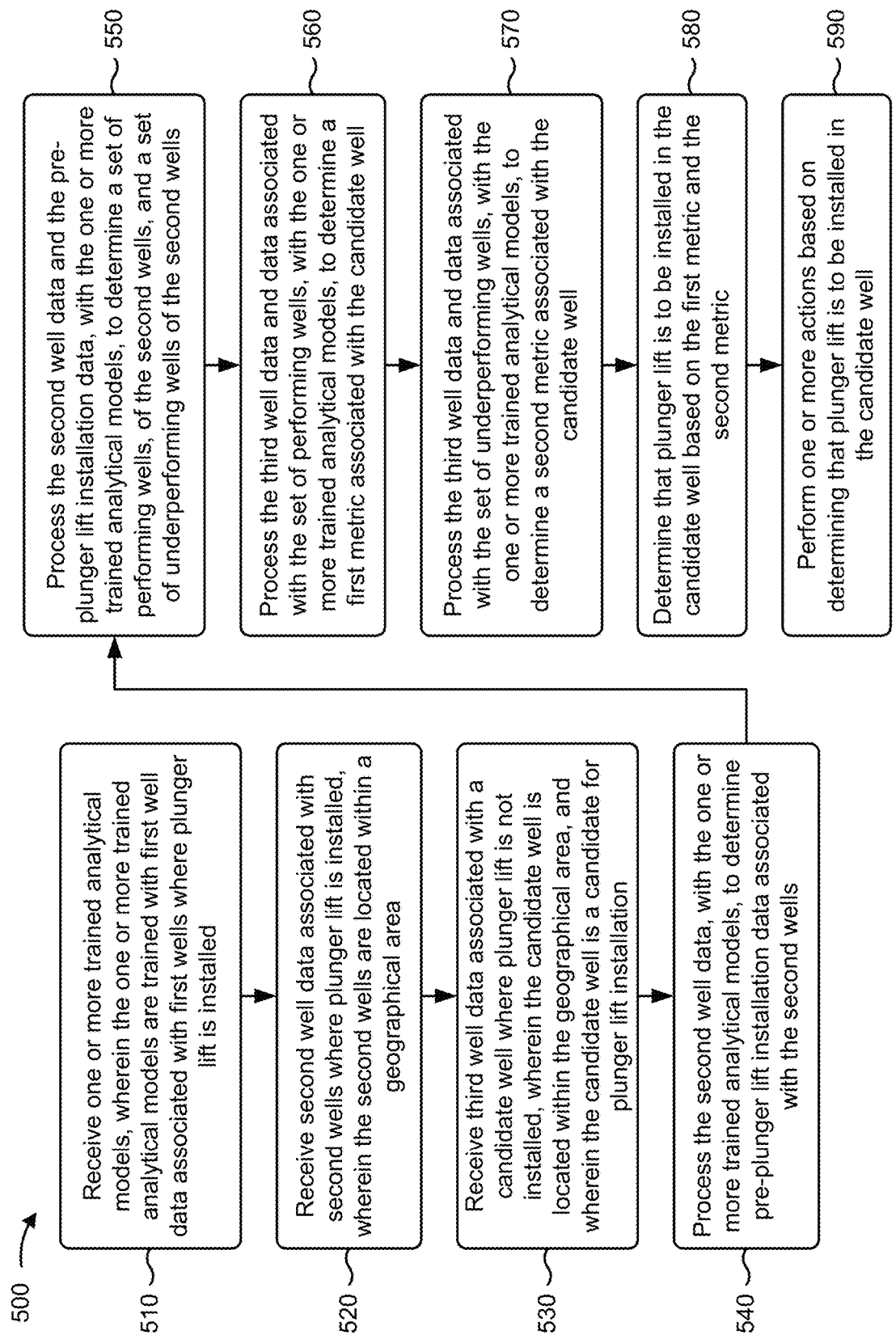

FIG. 5 is a flow chart of an example process 500 for utilizing analytical models to identify wells in which to install plunger lift for improved well production. In some implementations, one or more process blocks of FIG. 5 may be performed by an analytical platform (e.g., analytical platform 220). In some implementations, one or more process blocks of FIG. 5 may be performed by another device or a group of devices separate from or including the analytical platform, such as a client device (e.g., client device 210).

As shown in FIG. 5, process 500 may include receiving one or more trained analytical models, wherein the one or more trained analytical models are trained with first well data associated with first wells where plunger lift is installed (block 510). For example, the analytical platform (e.g., using computing resource 224, processor 320, communication interface 370, and/or the like) may receive one or more trained analytical models, as described above in connection with FIGS. 1A-3. In some aspects, the one or more trained analytical models may be trained with first well data associated with first wells where plunger lift is installed.

As further shown in FIG. 5, process 500 may include receiving second well data associated with second wells where plunger lift is installed, wherein the second wells are located within a geographical area (block 520). For example, the analytical platform (e.g., using computing resource 224, processor 320, communication interface 370, and/or the like) may receive second well data associated with second wells where plunger lift is installed, as described above in connection with FIGS. 1A-3. In some aspects, the second wells may be located within a geographical area.

As further shown in FIG. 5, process 500 may include receiving third well data associated with a candidate well where plunger lift is not installed, wherein the candidate well is located within the geographical area and wherein the candidate well is a candidate for plunger lift installation (block 530). For example, the analytical platform (e.g., using computing resource 224, processor 320, communication interface 370, and/or the like) may receive third well data associated with a candidate well where plunger lift is not installed, as described above in connection with FIGS. 1A-3. In some aspects, the candidate well may be located within the geographical area and may be a candidate for plunger lift installation.

As further shown in FIG. 5, process 500 may include processing the second well data, with the one or more trained analytical models, to determine pre-plunger lift installation data associated with the second wells (block 540). For example, the analytical platform (e.g., using computing resource 224, processor 320, memory 330, and/or the like) may process the second well data, with the one or more trained analytical models, to determine pre-plunger lift installation data associated with the second wells, as described above in connection with FIGS. 1A-3.

As further shown in FIG. 5, process 500 may include processing the second well data and the pre-plunger lift installation data, with the one or more trained analytical models, to determine a set of performing wells, of the second wells, and a set of underperforming wells of the second wells (block 550). For example, the analytical platform (e.g., using computing resource 224, processor 320, storage component 340, and/or the like) may process the second well data and the pre-plunger lift installation data, with the one or more trained analytical models, to determine a set of performing wells, of the second wells, and a set of underperforming wells of the second wells, as described above in connection with FIGS. 1A-3.

As further shown in FIG. 5, process 500 may include processing the third well data and data associated with the set of performing wells, with the one or more trained analytical models, to determine a first metric associated with the candidate well (block 560). For example, the analytical platform (e.g., using computing resource 224, processor 320, memory 330, and/or the like) may process the third well data and data associated with the set of performing wells, with the one or more trained analytical models, to determine a first metric associated with the candidate well, as described above in connection with FIGS. 1A-3.

As further shown in FIG. 5, process 500 may include processing the third well data and data associated with the set of underperforming wells, with the one or more trained analytical models, to determine a second metric associated with the candidate well (block 570). For example, the analytical platform (e.g., using computing resource 224, processor 320, storage component 340, and/or the like) may process the third well data and data associated with the set of underperforming wells, with the one or more trained analytical models, to determine a second metric associated with the candidate well, as described above in connection with FIGS. 1A-3.

As further shown in FIG. 5, process 500 may include determining that plunger lift is to be installed in the candidate well based on the first metric and the second metric (block 580). For example, the analytical platform (e.g., using computing resource 224, processor 320, memory 330, and/or the like) may determine that plunger lift is to be installed in the candidate well based on the first metric and the second metric, as described above in connection with FIGS. 1A-3.

As further shown in FIG. 5, process 500 may include performing one or more actions based on determining that plunger lift is to be installed in the candidate well (block 590). For example, the analytical platform (e.g., using computing resource 224, processor 320, memory 330, storage component 340, communication interface 370, and/or the like) may perform one or more actions based on determining that plunger lift is to be installed in the candidate well, as described above in connection with FIGS. 1A-3.

Process 500 may include additional implementations, such as any single implementation or any combination of implementations described below and/or in connection with one or more other processes described elsewhere herein.

In some implementations, the first well data may include data identifying reservoir pressures associated with the first wells, casing pressures associated with the first wells, tubing pressures associated with the first wells, line pressures associated with the first wells, bottom hole pressures associated with the first wells, production rates associated with the first wells, deferments associated with the first wells, drawdowns associated with the first wells, production volumes associated with the first wells, production efficiencies associated with the first wells, well depths associated with the first wells, and/or the like.

In some implementations, when performing the one or more actions, the analytical platform may cause a plunger to be ordered for the candidate well, and may cause, when the plunger is received, equipment to be dispatched, to the candidate well, for installing plunger lift in the candidate well. In some implementations, the analytical platform may determine a probability of increasing production of the candidate well when plunger lift is installed in the candidate well, and may provide information indicating the probability of increasing the production of the candidate well.

In some implementations, the analytical platform may determine an expected increase in production of the candidate well when plunger lift is installed in the candidate well; may provide, to a client device, information indicating the expected increase in the production of the candidate well; may receive, from the client device, a response indicating that plunger lift is to be installed in the candidate well; and may cause plunger lift to be installed in the candidate well based on the response.

In some implementations, when processing the second well data and the pre-plunger lift installation data, with the one or more trained analytical models, to determine the set of performing wells and the set of underperforming wells, the analytical platform may group a portion of the second wells into the set of performing wells based on a first production performance calculation associated with the portion of the second wells, and may group a remaining portion of the third wells into the set of underperforming wells based on a second production performance calculation associated with the remaining portion of the second wells.

In some implementations, the set of performing wells, of the second wells, and the set of underperforming wells, of the second wells, may be determined based on parameters associated with the second well data rather than the geographical area associated with the second wells.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

FIG. 6 is a flow chart of an example process 600 for utilizing analytical models to identify wells in which to install plunger lift for improved well production. In some implementations, one or more process blocks of FIG. 6 may be performed by an analytical platform (e.g., analytical platform 220). In some implementations, one or more process blocks of FIG. 6 may be performed by another device or a group of devices separate from or including the analytical platform, such as a client device (e.g., client device 210).

As shown in FIG. 6, process 600 may include receiving first well data associated with first wells where plunger lift is installed, wherein the first wells are located within a geographical area (block 610). For example, the analytical platform (e.g., using computing resource 224, processor 320, communication interface 370, and/or the like) may receive first well data associated with first wells where plunger lift is installed, as described above in connection with FIGS. 1A-3. In some aspects, the first wells may be located within a geographical area.

As further shown in FIG. 6, process 600 may include receiving second well data associated with a candidate well where plunger lift is not installed, wherein the candidate well is located within the geographical area and wherein the candidate well is a candidate for plunger lift installation (block 620). For example, the analytical platform (e.g., using computing resource 224, processor 320, communication interface 370, and/or the like) may receive second well data associated with a candidate well where plunger lift is not installed, as described above in connection with FIGS. 1A-3. In some aspects, the candidate well may be located within the geographical area and may a candidate for plunger lift installation.

As further shown in FIG. 6, process 600 may include processing the first well data, with a first model and a second model, to determine pre-plunger lift installation data associated with the first wells (block 630). For example, the analytical platform (e.g., using computing resource 224, processor 320, memory 330, and/or the like) may process the first well data, with a first model and a second model, to determine pre-plunger lift installation data associated with the first wells, as described above in connection with FIGS. 1A-3.

As further shown in FIG. 6, process 600 may include processing the first well data and the pre-plunger lift installation data, with a third model, to determine a set of performing wells, of the first wells, and a set of underperforming wells of the first wells (block 640). For example, the analytical platform (e.g., using computing resource 224, processor 320, storage component 340, and/or the like) may process the first well data and the pre-plunger lift installation data, with a third model, to determine a set of performing wells, of the first wells, and a set of underperforming wells of the first wells, as described above in connection with FIGS. 1A-3.

As further shown in FIG. 6, process 600 may include processing the second well data and data associated with the set of performing wells, with a fourth model, to determine a first metric associated with the candidate well (block 650). For example, the analytical platform (e.g., using computing resource 224, processor 320, memory 330, and/or the like) may process the second well data and data associated with the set of performing wells, with a fourth model, to determine a first metric associated with the candidate well, as described above in connection with FIGS. 1A-3.

As further shown in FIG. 6, process 600 may include processing the second well data and data associated with the set of underperforming wells, with the fourth model, to determine a second metric associated with the candidate well (block 660). For example, the analytical platform (e.g., using computing resource 224, processor 320, storage component 340, and/or the like) may process the second well data and data associated with the set of underperforming wells, with the fourth model, to determine a second metric associated with the candidate well, as described above in connection with FIGS. 1A-3.

As further shown in FIG. 6, process 600 may include determining whether to install plunger lift in the candidate well based on the first metric and the second metric (block 670). For example, the analytical platform (e.g., using computing resource 224, processor 320, memory 330, and/or the like) may determine whether to install plunger lift in the candidate well based on the first metric and the second metric, as described above in connection with FIGS. 1A-3.

As further shown in FIG. 6, process 600 may include performing one or more actions based on determining whether to install plunger lift in the candidate well (block 680). For example, the analytical platform (e.g., using computing resource 224, processor 320, memory 330, storage component 340, communication interface 370, and/or the like) may perform one or more actions based on determining whether to install plunger lift in the candidate well, as described above in connection with FIGS. 1A-3.

Process 600 may include additional implementations, such as any single implementation or any combination of implementations described below and/or in connection with one or more other processes described elsewhere herein.

In some implementations, the first model may include a correlation analysis model, the second model may include a decision tree analysis model, the third model may include a clustering model, and the fourth model may include a Euclidean distance calculation model. In some implementations, the set of performing wells, of the first wells, and the set of underperforming wells, of the first wells, may be determined based on parameters associated with the first well data rather than the geographical area associated with the first wells.

In some implementations, when processing the second well data and data associated with the set of performing wells, with the fourth model, to determine the first metric associated with the candidate well, the analytical platform may calculate a first centroid associated with the set of performing wells based on the data associated with the set of performing wells, and may calculate a first Euclidean distance between particular parameters associated with the second well data and the first centroid associated with the set of performing wells, where the first Euclidean distance may be the first metric.

In some implementations, when processing the second well data and data associated with the set of underperforming wells, with the fourth model, to determine the second metric associated with the candidate well, the analytical platform may calculate a second centroid associated with the set of underperforming wells based on the data associated with the set of underperforming wells, and may calculate a second Euclidean distance between particular parameters associated with the second well data and the second centroid associated with the set of underperforming wells, where the second Euclidean distance may be the second metric.

In some implementations, when determining whether to install plunger lift in the candidate well based on the first metric and the second metric, the analytical platform may determine that plunger lift is to be installed in the candidate well when the first Euclidean distance is less than or equal to the second Euclidean distance, and may determine that plunger lift is not to be installed in the candidate well when the first Euclidean distance is greater than the second Euclidean distance.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   receiving, by a device, first well data associated with first wells where plunger lift is installed;
   training, by the device, one or more analytical models with the first well data to generate one or more trained analytical models;
   receiving, by the device, second well data associated with second wells where plunger lift is installed,
      wherein the second wells are located within a geographical area;
   receiving, by the device, third well data associated with a candidate well where plunger lift is not installed,
      wherein the candidate well is located within the geographical area, and
      wherein the candidate well is a candidate for plunger lift installation;
   processing, by the device, the second well data, with the one or more trained analytical models, to determine pre-plunger lift installation data associated with the second wells;
   processing, by the device, the second well data and the pre-plunger lift installation data, with the one or more trained analytical models, to determine a set of performing wells, of the second wells, and a set of underperforming wells of the second wells;
   processing, by the device, the third well data and data associated with the set of performing wells, with the one or more trained analytical models, to determine a first metric associated with the candidate well;
   processing, by the device, the third well data and data associated with the set of underperforming wells, with the one or more trained analytical models, to determine a second metric associated with the candidate well;
   determining, by the device, whether to install plunger lift in the candidate well based on the first metric and the second metric; and
   performing, by the device, one or more actions based on determining whether to install plunger lift in the candidate well,
      wherein the one or more actions include:
         causing a plunger to be ordered,
         dispatching, when the plunger is received, equipment to the candidate well, and
         causing the plunger lift to be installed in the candidate well.

2. The method of claim 1, wherein performing the one or more actions includes one or more of:
   providing, to a client device, information indicating whether to install plunger lift in the candidate well; or
   retraining the one or more analytical models based on the information indicating whether to install plunger lift in the candidate well.

3. The method of claim 1, wherein processing the second well data, with the one or more trained analytical models, to determine the pre-plunger lift installation data comprises:
   performing a correlation analysis on the second well data to determine a correlation between parameters of the second well data;
   performing, based on the correlation between the parameters, a decision tree analysis on the second well data to determine particular parameters of the parameters of the second well data; and
   determining the pre-plunger lift installation data based on the particular parameters.

4. The method of claim 1, wherein processing the second well data and the pre-plunger lift installation data, with the one or more trained analytical models, to determine the set of performing wells and the set of underperforming wells comprises:
   grouping a portion of the second wells into the set of performing wells based on particular parameters associated with the second well data; and
   grouping a remaining portion of the second wells into the set of underperforming wells based on the particular parameters associated with the second well data.

5. The method of claim 1, wherein processing the third well data and data associated with the set of performing wells, with the one or more trained analytical models, to determine the first metric associated with the candidate well comprises:

calculating a first centroid associated with the set of performing wells based on the data associated with the set of performing wells; and calculating a first Euclidean distance between particular parameters associated with the third well data and the first centroid associated with the set of performing wells, wherein the first Euclidean distance is the first metric.

6. The method of claim 5, wherein processing the third well data and data associated with the set of underperforming wells, with the one or more trained analytical models, to determine the second metric associated with the candidate well comprises:

calculating a second centroid associated with the set of underperforming wells based on the data associated with the set of underperforming wells; and calculating a second Euclidean distance between particular parameters associated with the third well data and the second centroid associated with the set of underperforming wells, wherein the second Euclidean distance is the second metric.

7. The method of claim 6, wherein determining whether to install plunger lift in the candidate well based on the first metric and the second metric comprises:

determining that plunger lift is to be installed in the candidate well when the first Euclidean distance is less than or equal to the second Euclidean distance; and determining that plunger lift is not to be installed in the candidate well when the first Euclidean distance is greater than the second Euclidean distance.

8. A device, comprising:
one or more memories; and
one or more processors, communicatively coupled to the one or more memories, to:
 receive one or more trained analytical models,
  wherein the one or more trained analytical models are trained with:
   first well data associated with first wells where plunger lift is installed;
 receive second well data associated with second wells where plunger lift is installed,
  wherein the second wells are located within a geographical area;
 receive third well data associated with a candidate well where plunger lift is not installed,
  wherein the candidate well is located within the geographical area, and
  wherein the candidate well is a candidate for plunger lift installation;
 process the second well data, with the one or more trained analytical models, to determine pre-plunger lift installation data associated with the second wells;
 process the second well data and the pre-plunger lift installation data, with the one or more trained analytical models, to determine a set of performing wells, of the second wells, and a set of underperforming wells of the second wells;
 process the third well data and data associated with the set of performing wells, with the one or more trained analytical models, to determine a first metric associated with the candidate well;
 process the third well data and data associated with the set of underperforming wells, with the one or more trained analytical models, to determine a second metric associated with the candidate well;
 determine that plunger lift is to be installed in the candidate well based on the first metric and the second metric; and
 perform one or more actions based on determining that plunger lift is to be installed in the candidate well,
  wherein the one or more processors, to perform the one or more actions, are to:
   cause a plunger to be ordered,
   dispatch, when the plunger is received, equipment to the candidate well, and
   cause the plunger lift to be installed in the candidate well.

9. The device of claim 8, wherein the first well data includes data identifying one or more of:
 reservoir pressures associated with the first wells,
 casing pressures associated with the first wells,
 tubing pressures associated with the first wells,
 line pressures associated with the first wells,
 bottom hole pressures associated with the first wells,
 production rates associated with the first wells,
 deferments associated with the first wells,
 drawdowns associated with the first wells,
 production volumes associated with the first wells,
 production efficiencies associated with the first wells, or
 well depths associated with the first wells.

10. The device of claim 8, wherein the one or more processors are further to:
 determine a probability of increasing production of the candidate well when plunger lift is installed in the candidate well; and
 provide information indicating the probability of increasing the production of the candidate well.

11. The device of claim 8, wherein the one or more processors are further to:
 determine an expected increase in production of the candidate well when plunger lift is installed in the candidate well;
 provide, to a client device, information indicating the expected increase in the production of the candidate well;
 receive, from the client device, a response indicating that plunger lift is to be installed in the candidate well; and
 cause plunger lift to be installed in the candidate well based on the response.

12. The device of claim 8, wherein the one or more processors, when processing the second well data and the pre-plunger lift installation data, with the one or more trained analytical models, to determine the set of performing wells and the set of underperforming wells, are to:
 group a portion of the second wells into the set of performing wells based on a first production performance calculation associated with the portion of the second wells; and
 group a remaining portion of the third wells into the set of underperforming wells based on a second production performance calculation associated with the remaining portion of the second wells.

13. The device of claim 8, wherein the set of performing wells, of the second wells, and the set of underperforming wells, of the second wells, are determined based on parameters associated with the second well data rather than the geographical area associated with the second wells.

14. The device of claim 8, wherein the first wells and the second wells comprise at least one of:
 gas wells, or
 liquid wells.

15. A non-transitory computer-readable medium storing instructions, the instructions comprising:
one or more instructions that, when executed by one or more processors, cause the one or more processors to:
receive first well data associated with first wells where plunger lift is installed,
wherein the first wells are located within a geographical area;
receive second well data associated with a candidate well where plunger lift is not installed,
wherein the candidate well is located within the geographical area, and
wherein the candidate well is a candidate for plunger lift installation;
process the first well data, with a first model and a second model, to determine pre-plunger lift installation data associated with the first wells;
process the first well data and the pre-plunger lift installation data, with a third model, to determine a set of performing wells, of the first wells, and a set of underperforming wells of the first wells;
process the second well data and data associated with the set of performing wells, with a fourth model, to determine a first metric associated with the candidate well;
process the second well data and data associated with the set of underperforming wells, with the fourth model, to determine a second metric associated with the candidate well;
determine whether to install plunger lift in the candidate well based on the first metric and the second metric; and
perform one or more actions based on determining whether to install plunger lift in the candidate well,
wherein the one or more instructions, that cause the one or more processors to perform the one or more actions, cause the one or more processors to:
cause a plunger to be ordered,
dispatch, when the plunger is received, equipment to the candidate well, and
cause the plunger lift to be installed in the candidate well.

16. The non-transitory computer-readable medium of claim 15, wherein:
the first model includes a correlation analysis model,
the second model includes a decision tree analysis model,
the third model includes a clustering model, and
the fourth model includes a Euclidean distance calculation model.

17. The non-transitory computer-readable medium of claim 15, wherein the set of performing wells, of the first wells, and the set of underperforming wells, of the first wells, are determined based on parameters associated with the first well data rather than the geographical area associated with the first wells.

18. The non-transitory computer-readable medium of claim 15, wherein the one or more instructions, that cause the one or more processors to process the second well data and data associated with the set of performing wells, with the fourth model, to determine the first metric associated with the candidate well, cause the one or more processors to:
calculate a first centroid associated with the set of performing wells based on the data associated with the set of performing wells; and
calculate a first Euclidean distance between particular parameters associated with the second well data and the first centroid associated with the set of performing wells,
wherein the first Euclidean distance is the first metric.

19. The non-transitory computer-readable medium of claim 18, wherein the one or more instructions, that cause the one or more processors to process the second well data and data associated with the set of underperforming wells, with the fourth model, to determine the second metric associated with the candidate well, cause the one or more processors to:
calculate a second centroid associated with the set of underperforming wells based on the data associated with the set of underperforming wells; and
calculate a second Euclidean distance between particular parameters associated with the second well data and the second centroid associated with the set of underperforming wells,
wherein the second Euclidean distance is the second metric.

20. The non-transitory computer-readable medium of claim 19, wherein the one or more instructions, that cause the one or more processors to determine whether to install plunger lift in the candidate well based on the first metric and the second metric, cause the one or more processors to:
determine that plunger lift is to be installed in the candidate well when the first Euclidean distance is less than or equal to the second Euclidean distance; and
determine that plunger lift is not to be installed in the candidate well when the first Euclidean distance is greater than the second Euclidean distance.

* * * * *